(12) United States Patent
Peng

(10) Patent No.: US 11,027,650 B2
(45) Date of Patent: Jun. 8, 2021

(54) METHOD AND APPARATUS FOR IMPROVING OPERATION OF A MOTOR VEHICLE

(71) Applicant: NIO USA, Inc., San Jose, CA (US)

(72) Inventor: James Peng, La Habra, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/677,396

(22) Filed: Nov. 7, 2019

(65) Prior Publication Data

US 2021/0138957 A1 May 13, 2021

(51) Int. Cl.
| | |
|---|---|
| *G01C 1/00* | (2006.01) |
| *B60Q 9/00* | (2006.01) |
| *B60L 58/12* | (2019.01) |
| *G07C 5/08* | (2006.01) |

(52) U.S. Cl.
CPC ............... *B60Q 9/00* (2013.01); *B60L 58/12* (2019.02); *G07C 5/08* (2013.01); *B60L 2240/36* (2013.01); *B60L 2240/642* (2013.01); *B60L 2240/66* (2013.01); *B60L 2240/68* (2013.01)

(58) Field of Classification Search
CPC .................................. B60W 10/00; G01C 1/00
See application file for complete search history.

(56) References Cited

U.S. PATENT DOCUMENTS

| | | | |
|---|---|---|---|
| 5,035,302 A | 7/1991 | Thangavelu | |
| 5,130,659 A | 7/1992 | Sloan | |
| 6,137,425 A | 10/2000 | Oster et al. | |
| 7,954,579 B2 | 6/2011 | Rodriguez et al. | |
| 9,180,783 B1 | 11/2015 | Penilla et al. | |
| 9,288,938 B2 | 3/2016 | Cavender-Bares et al. | |
| 9,317,033 B2 | 4/2016 | Ibanez-Guzman et al. | |
| 9,371,007 B1 | 6/2016 | Penilla et al. | |
| 9,714,837 B2 | 7/2017 | North et al. | |
| 9,731,618 B2 | 8/2017 | Asai et al. | |
| 9,798,799 B2 | 10/2017 | Wolverton et al. | |
| 9,947,145 B2 | 4/2018 | Wang et al. | |
| 10,015,537 B2 | 7/2018 | Li et al. | |
| 10,067,502 B1 | 9/2018 | Delp | |
| 10,217,160 B2 | 2/2019 | Penilla et al. | |

(Continued)

OTHER PUBLICATIONS

"Knowing your vehicle, Brake Coach," Ford Motor Company, Feb. 26, 2017, retrieved from https://youtu.be/r1S_Jshm4Kk, 9 pages.

(Continued)

*Primary Examiner* — Shirley Lu
(74) *Attorney, Agent, or Firm* — Sheridan Ross P.C.

(57) ABSTRACT

A device includes a microprocessor and a computer readable medium coupled to the microprocessor. The computer readable medium includes instructions stored thereon that cause the microprocessor to receive output from at least one sensor monitoring a travel context of a vehicle and determine, based on the output received, a condition of the vehicle. The instructions cause the microprocessor to determine, based on the determined condition of the vehicle, modified driving operations to improve the operation of the vehicle. The instructions cause the microprocessor to construct a message describing the determined modified driving operations and communicate one or more modified driving operations to an operator for potential implementation.

20 Claims, 16 Drawing Sheets

(56) References Cited

U.S. PATENT DOCUMENTS

| | | | |
|---|---|---|---|
| 10,234,302 B2 | 3/2019 | Singhal et al. | |
| 10,286,915 B2 | 5/2019 | Xiao et al. | |
| 10,323,952 B2 | 6/2019 | Li et al. | |
| 10,360,518 B2 | 7/2019 | Hirose et al. | |
| 10,369,974 B2 | 8/2019 | Carlson et al. | |
| 10,410,250 B2 | 9/2019 | Singhal et al. | |
| 10,471,829 B2 | 11/2019 | Yellambalase et al. | |
| 10,606,274 B2 | 3/2020 | Yalla et al. | |
| 10,635,109 B2 | 4/2020 | Guo et al. | |
| 10,668,823 B2 | 6/2020 | Herb et al. | |
| 10,710,633 B2 | 7/2020 | Carlson et al. | |
| 2004/0093155 A1 | 5/2004 | Simonds et al. | |
| 2008/0183348 A1* | 7/2008 | Arita | B60W 10/18 701/22 |
| 2010/0049397 A1 | 2/2010 | Liu et al. | |
| 2010/0134302 A1 | 6/2010 | Ahn et al. | |
| 2011/0032110 A1 | 2/2011 | Taguchi | |
| 2011/0213656 A1 | 9/2011 | Turner | |
| 2011/0288765 A1 | 11/2011 | Conway | |
| 2012/0173135 A1 | 7/2012 | Gutman | |
| 2013/0105264 A1 | 5/2013 | Ruth et al. | |
| 2013/0179057 A1 | 7/2013 | Fisher et al. | |
| 2014/0125485 A1 | 5/2014 | Juhasz | |
| 2014/0371969 A1 | 12/2014 | Asai et al. | |
| 2015/0165905 A1 | 6/2015 | Filev et al. | |
| 2015/0294329 A1 | 10/2015 | Saito et al. | |
| 2015/0298565 A1 | 10/2015 | Iwamura et al. | |
| 2015/0314790 A1 | 11/2015 | Deragarden et al. | |
| 2015/0326037 A1 | 11/2015 | Borhan et al. | |
| 2015/0345971 A1 | 12/2015 | Meuleau et al. | |
| 2016/0054735 A1 | 2/2016 | Switkes et al. | |
| 2016/0176402 A1 | 6/2016 | Andersson et al. | |
| 2016/0368396 A1 | 12/2016 | Konet et al. | |
| 2016/0375788 A1 | 12/2016 | Liu | |
| 2017/0030728 A1 | 2/2017 | Baglino et al. | |
| 2017/0087999 A1 | 3/2017 | Miller et al. | |
| 2017/0088000 A1 | 3/2017 | Payne et al. | |
| 2017/0088117 A1 | 3/2017 | Ogawa | |
| 2017/0352082 A1 | 12/2017 | Aziz et al. | |
| 2017/0355369 A1 | 12/2017 | La | |
| 2018/0012091 A1 | 1/2018 | Ricci | |
| 2018/0082213 A1 | 3/2018 | McCord | |
| 2018/0143639 A1 | 5/2018 | Singhal et al. | |
| 2018/0170382 A1 | 6/2018 | Soliman et al. | |
| 2019/0004526 A1 | 1/2019 | Soliman | |
| 2019/0016331 A1 | 1/2019 | Carlson et al. | |
| 2019/0031037 A1 | 1/2019 | Fendt | |
| 2019/0041228 A1 | 2/2019 | Singhal | |
| 2019/0107406 A1 | 4/2019 | Cox et al. | |
| 2019/0146500 A1 | 5/2019 | Yalla et al. | |
| 2019/0186939 A1 | 6/2019 | Cox et al. | |
| 2020/0156658 A1* | 5/2020 | Borhan | G01C 21/3469 |
| 2020/0160619 A1* | 5/2020 | Wang | G07C 5/004 |
| 2020/0225661 A1 | 7/2020 | Guo et al. | |

OTHER PUBLICATIONS

Thoubboron, "What's the cheapest time of day to use electricity with time-of-use-rates?," energysage, Jul. 2018, retrieved from https://news.energysage.com/whats-the-cheapest-time-of-day-to-use-electricity-with-time-of-use-rates/, 4 pages.

* cited by examiner

| Condition | Safety Score | Weight Associated with Safety Score | Raw Priority Score (RPS) | Priority Level | Modified Driving Operation |
|---|---|---|---|---|---|
| Limited range | 10 | 1.0 | 10.0 | 1 | Reduce speed/Turn off AC |
| Dangerous road conditions | 9 | 0.8 | 7.2 | 2 | Reduce speed/determine alternate route |
| Dangerous weather conditions | 6 | 0.5 | 3.0 | 3 | Reduce speed/determine alternate route |
| Traffic | 5 | 0.2 | 1.0 | 4 | Auto start-stop/determine alternate route |
| Excess fuel consumption | 5 | 0.2 | 1.0 | 4 | Reduce speed/auto start-stop/reduce excessive braking/Turn of AC |

*Fig. 15*

METHOD AND APPARATUS FOR IMPROVING OPERATION OF A MOTOR VEHICLE

FIELD

The present disclosure is generally directed to vehicle systems, in particular, toward monitoring and improving operations of a vehicle.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

For traditional gasoline-powered vehicles and hybrid vehicles, there is a need, both from the desires of customers and due to government regulations, to increase miles per gallon (MPG). Further, increasing MPG can extend the range of a vehicle prior to refueling. In addition to automotive design decisions, there are several known methods of improving MPG through driving techniques. These include reduced speed, less aggressive braking, enabling "auto stop-start" features, and reduced use of on-board electrical systems such as air conditioning or entertainment systems.

For electric vehicles, range anxiety has been a challenge for every automotive maker in the field. Electric vehicles generally have shorter range than gasoline-powered and hybrid vehicles and thus it is necessary for the operator to be aware of how many driving miles remain before charging is necessary. Known methods for improving range are similar to those for improving MPG.

While existing vehicles are equipped to monitor driving conditions to calculate MPG and/or range, a dangerous condition may arise when the operator of the vehicle is unaware that the remaining range of the vehicle is shorter than the distance to the nearest refueling or recharging station.

In addition, techniques are known to monitor other driving conditions such as traffic, weather, and road conditions, and to determine improved driving operations to increase safety and energy efficiency.

Accordingly, there exists a need for vehicles to communicate suggestions for improving MPG, range, or other driving conditions to the driver.

BRIEF DESCRIPTION OF THE DRAWINGS

FIG. 15 illustrates example operations of the controller/microprocessor 920 according to at least one embodiment.

DETAILED DESCRIPTION

Embodiments of the present disclosure will be described in connection with a vehicle, and in some embodiments, an electric vehicle, rechargeable electric vehicle, and/or hybrid-electric vehicle and associated systems. It will be understood that embodiments of the present disclosure are also applicable to traditional gasoline-powered vehicles.

Figure 1:
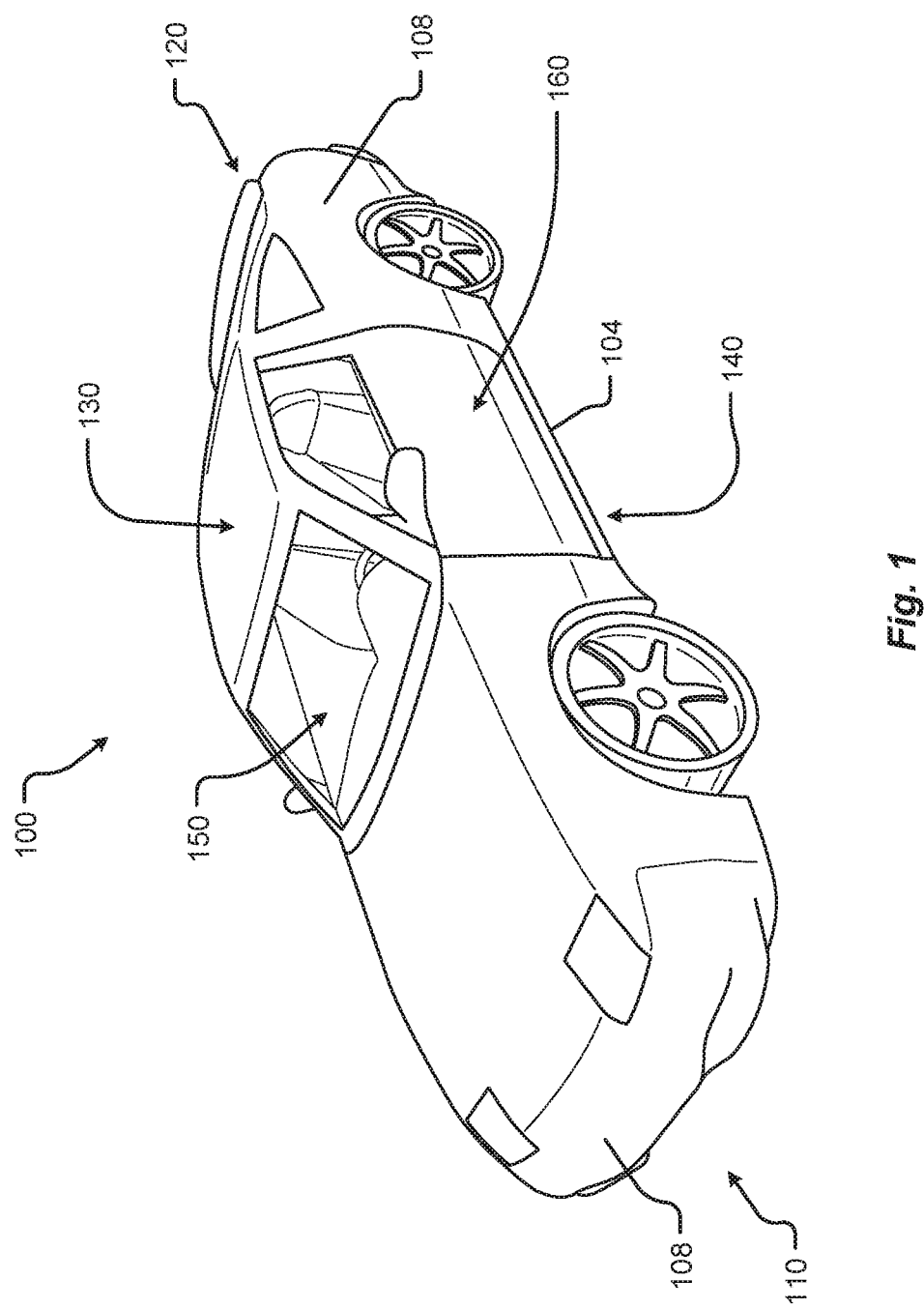
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
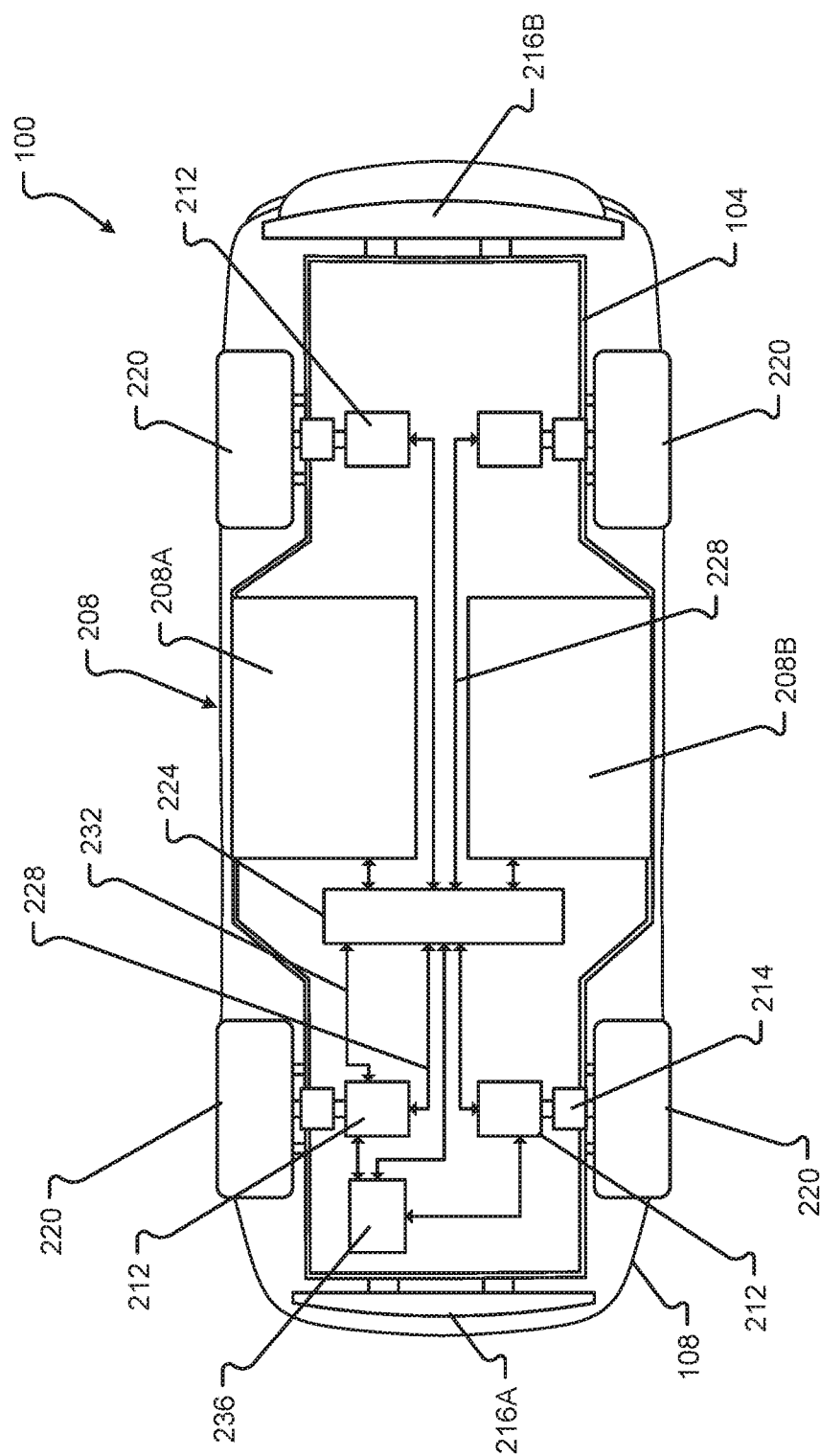
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
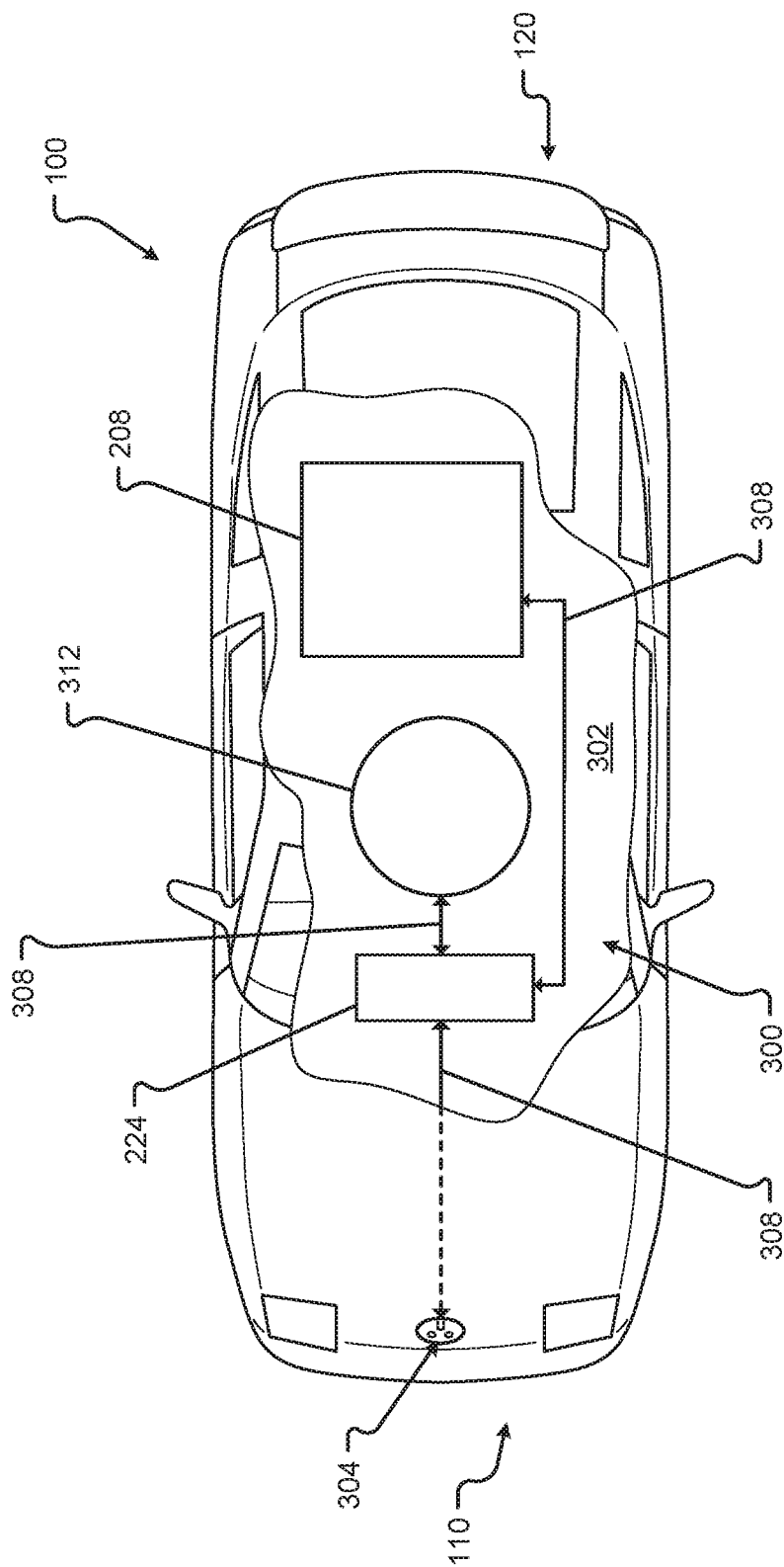
FIG. 3 shows a plan view of the vehicle in accordance with embodiments of the present disclosure

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
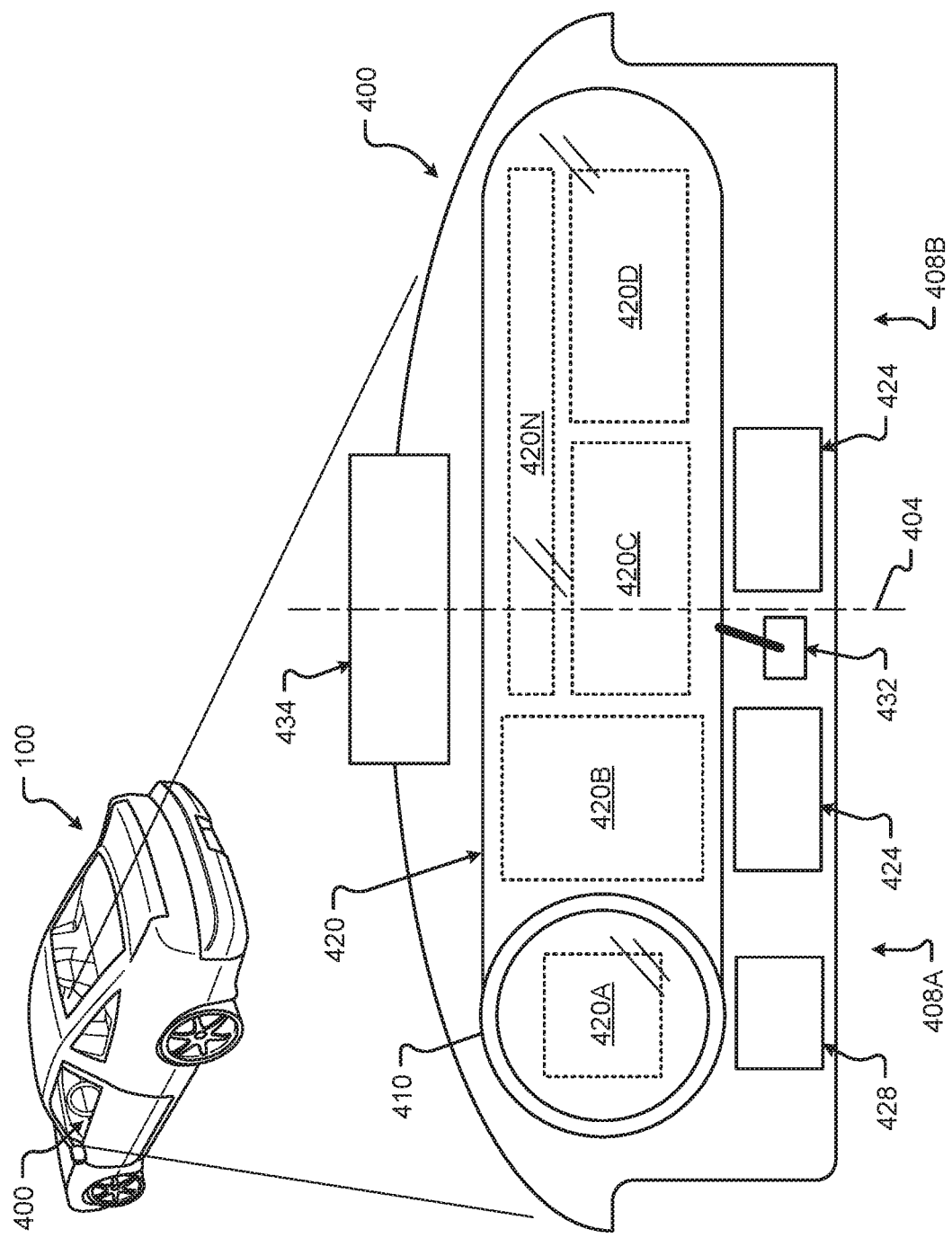
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
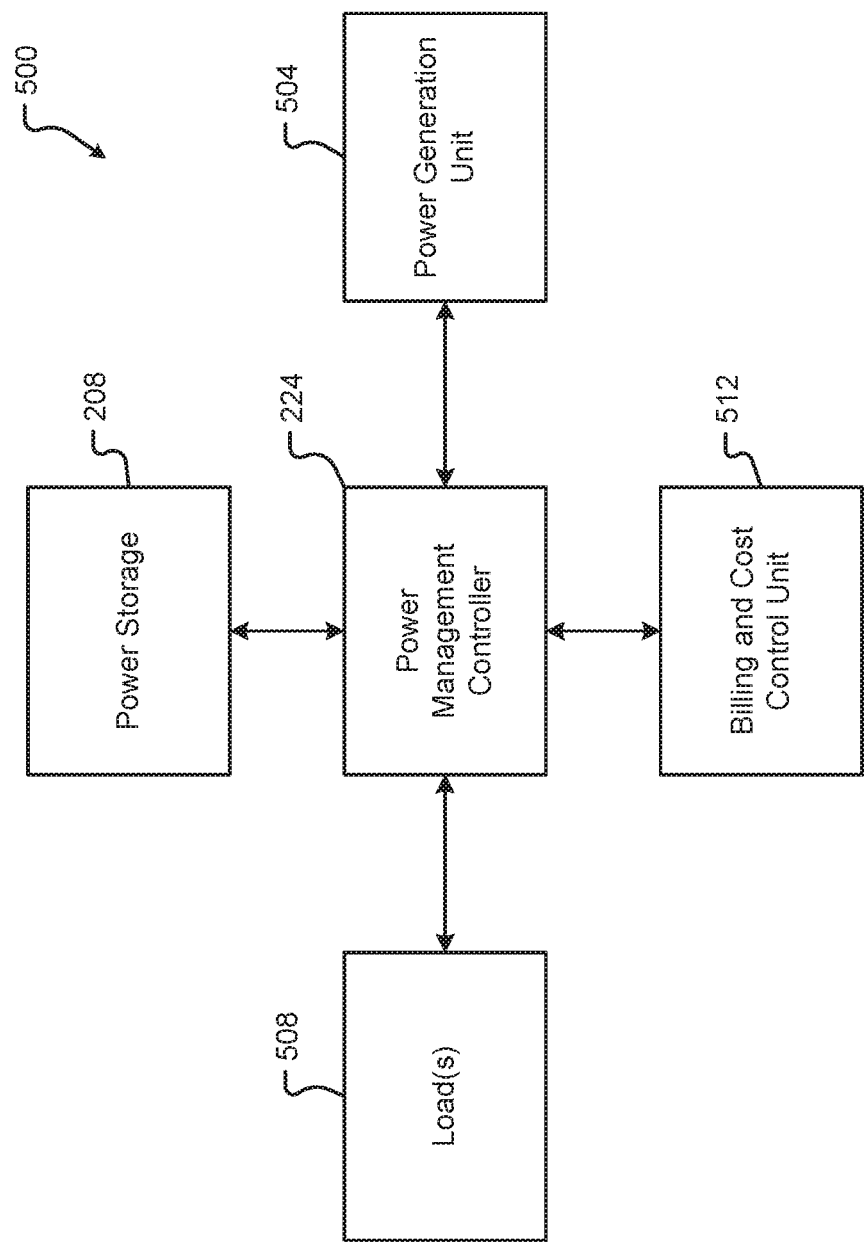
FIG. 5 is a block diagram of an embodiment of an electrical system of the vehicle.

An embodiment of the electrical system 500 associated with the vehicle 100 may be as shown in FIG. 5. The electrical system 500 can include power source(s) that generate power, power storage that stores power, and/or load(s) that consume power. Power sources may be associated with a power generation unit 504. Power storage may be associated with a power storage system 208. Loads may be associated with loads 508. The electrical system 500 may be managed by a power management controller 224. Further, the electrical system 500 can include one or more other interfaces or controllers, which can include the billing and cost control unit 512.

Figure 6:
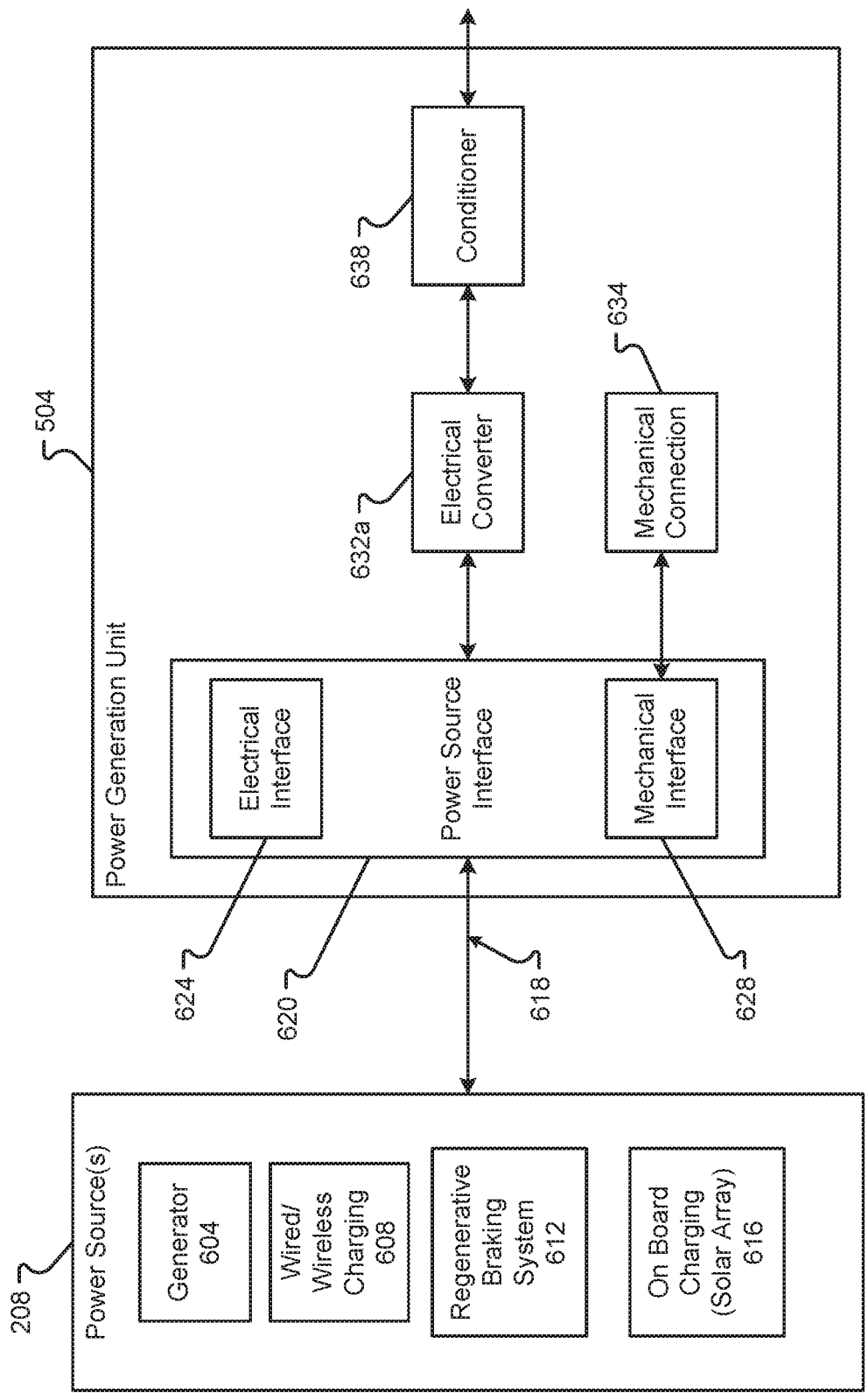
FIG. 6 is a block diagram of an embodiment of a power generation unit associated with the electrical system of the vehicle.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6. Generally, the power generation unit 504 may be electrically coupled to one or more power sources 208. The power sources 208 can include power sources internal and/or associated with the vehicle 100 and/or power sources external to the vehicle 100 to which the vehicle 100 electrically connects. One of the internal power sources can include an on board generator 604. The generator 604 may be an alternating current (AC) generator, a direct current (DC) generator or a self-excited generator. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take-off. The generator 604 may also have another mechanical coupling to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 608 can also include a physical/electrical connection 634 to the power generation unit 504.

The electrical energy from the power source 208 can be processed through the power source interface 624 to an electric converter 632. The electric converter 632 may convert the characteristics of the power from one of the power sources into a useable form that may be used either by the power storage 208 or one or more loads 508 within the vehicle 100. The electrical converter 624 may include any electronics or electrical devices and/or component that can change electrical characteristics, e.g., AC frequency, amplitude, phase, etc. associated with the electrical energy provided by the power source 208. The converted electrical energy may then be provided to an optional conditioner 1638. The conditioner 1638 may include any electronics or electrical devices and/or component that may further condition the converted electrical energy by removing harmonics, noise, etc. from the electrical energy to provide a more stable and effective form of power to the vehicle 100.

Figure 7:
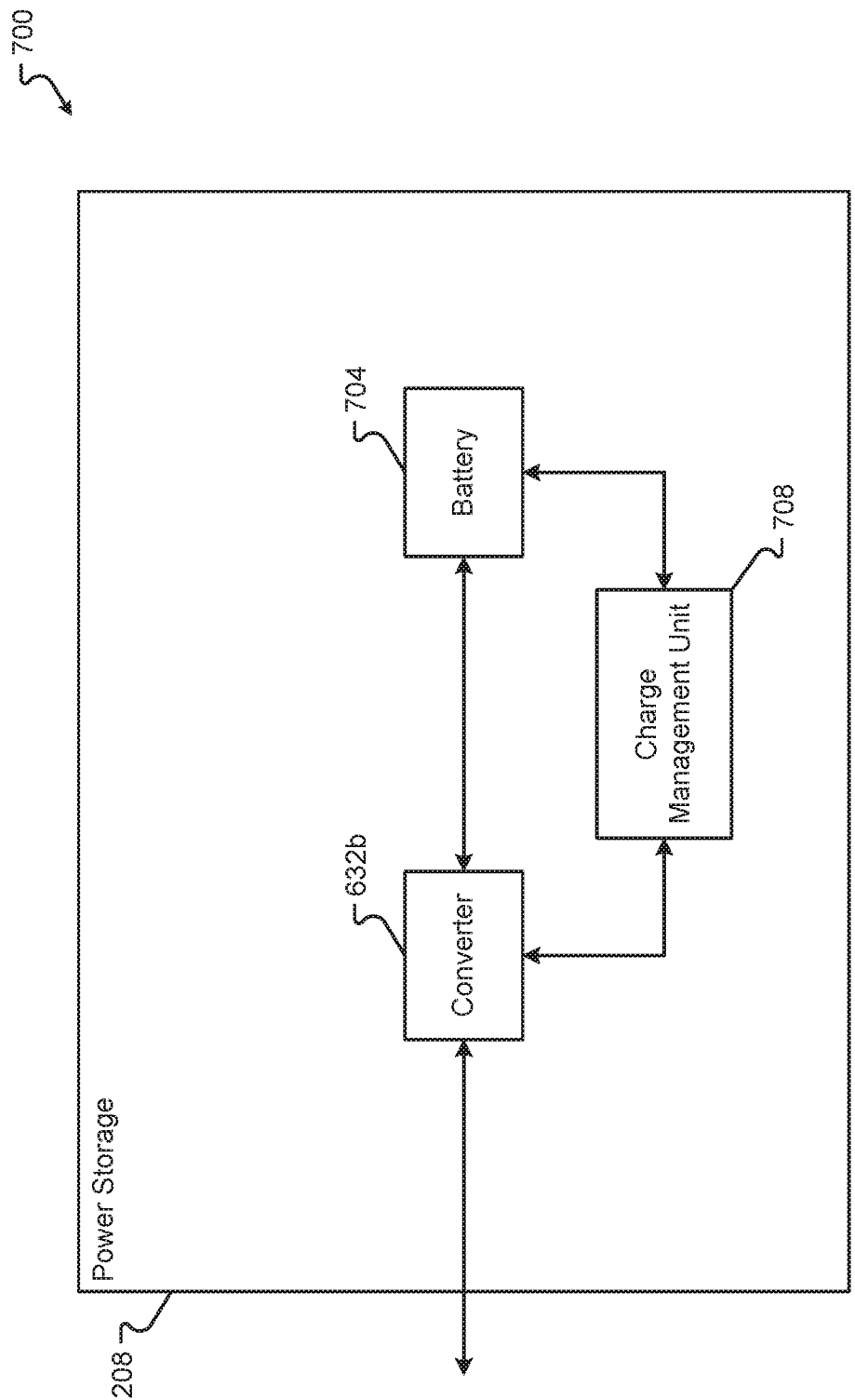
FIG. 7 is a block diagram of an embodiment of power storage associated with the electrical system of the vehicle.

An embodiment of the power storage 208 may be as shown in FIG. 7. The power storage unit can include an electrical converter 632b, one or more batteries, one or more rechargeable batteries, one or more capacitors, one or more accumulators, one or more supercapacitors, one or more ultrabatteries, and/or superconducting magnetics 704, and/or a charge management unit 708. The converter 632b may be the same or similar to the electrical converter 632a shown in FIG. 6. The converter 632b may be a replacement for the electric converter 632a shown in FIG. 6 and thus eliminate the need for the electrical converter 632a as shown in FIG. 6. However, if the electrical converter 632a is provided in the power generation unit 504, the converter 632b, as shown in the power storage unit 208, may be eliminated. The converter 632b can also be redundant or different from the electrical converter 632a shown in FIG. 6 and may provide a different form of energy to the battery and/or capacitors 704. Thus, the converter 632b can change the energy characteristics specifically for the battery/capacitor 704.

The battery 704 can be any type of battery for storing electrical energy, for example, a lithium ion battery, a lead acid battery, a nickel cadmium battery, etc. Further, the battery 704 may include different types of power storage systems, such as, ionic fluids or other types of fuel cell systems. The energy storage 704 may also include one or more high-capacity capacitors 704. The capacitors 704 may be used for long-term or short-term storage of electrical energy. The input into the battery or capacitor 704 may be different from the output, and thus, the capacitor 704 may be charged quickly but drain slowly. The functioning of the converter 632 and battery capacitor 704 may be monitored or managed by a charge management unit 708.

The charge management unit 708 can include any hardware (e.g., any electronics or electrical devices and/or components), software, or firmware operable to adjust the operations of the converter 632 or batteries/capacitors 704. The charge management unit 708 can receive inputs or periodically monitor the converter 632 and/or battery/capacitor 704 from this information; the charge management unit 708 may then adjust settings or inputs into the converter 632 or battery/capacitor 704 to control the operation of the power storage system 208.

In some embodiments, the charge management unit 708 is a battery management system (BMS). As will be appreciated, the BMS can be any electronic system that manages a rechargeable battery (cell or battery pack), such as by protecting the battery from operating outside its safe operating area, monitoring its state, calculating secondary data, reporting that data, controlling its environment, authenticating it and/or balancing it. The BMS can be built together with a battery pack and an external communication data bus to form a smart battery pack that can be charged by smart battery charger. The BMS can monitor the state of the battery or battery pack by sensing one or more of: voltage: total voltage, voltages of individual cells, minimum and maximum cell voltage or voltage of periodic taps; temperature: average temperature, coolant intake temperature, coolant output temperature, or temperatures of individual cells; state of charge (SOC) or depth of charge (DOD), to indicate the charge level of the battery or individual cells; state of health (SOH), a variously-defined measurement of the remaining capacity of the battery as % of the original capacity; state of power (SOP), the amount of power available for a defined time interval given the current power usage, temperature and other conditions; state of Safety (SOS)1 coolant flow: for air or fluid cooled batteries; and/or current: current in or out of the battery.

Additionally, the BMS may calculate values based on the above items, such as maximum charge current as a charge current limit (CCL); maximum discharge current as a discharge current limit (DCL); energy [kWh] delivered since last charge or charge cycle; internal impedance of a cell (to determine open circuit voltage); charge [Ah] delivered or stored (sometimes this feature is called Coulomb counter); total energy delivered since first use; total operating time since first use; and/or total number of cycles.

The BMS can use the sensed parameters to protect the battery pack by preventing it from operating outside its safe operating area and to maximize the battery pack's capacity, and prevent localized under-charging or over-charging. The BMS can actively ensure that all the cells that compose the battery are kept at the same voltage or State of Charge, through balancing. The BMS can balance the cells by: wasting energy from the most charged cells by connecting them to a load (such as through passive regulators); shuffling energy from the most charged cells to the least charged cells (balancers); reducing the charging current to a sufficiently low level that will not damage fully charged cells, while less charged cells may continue to charge (does not apply to Lithium chemistry cells); and modular charging.

Figure 8:
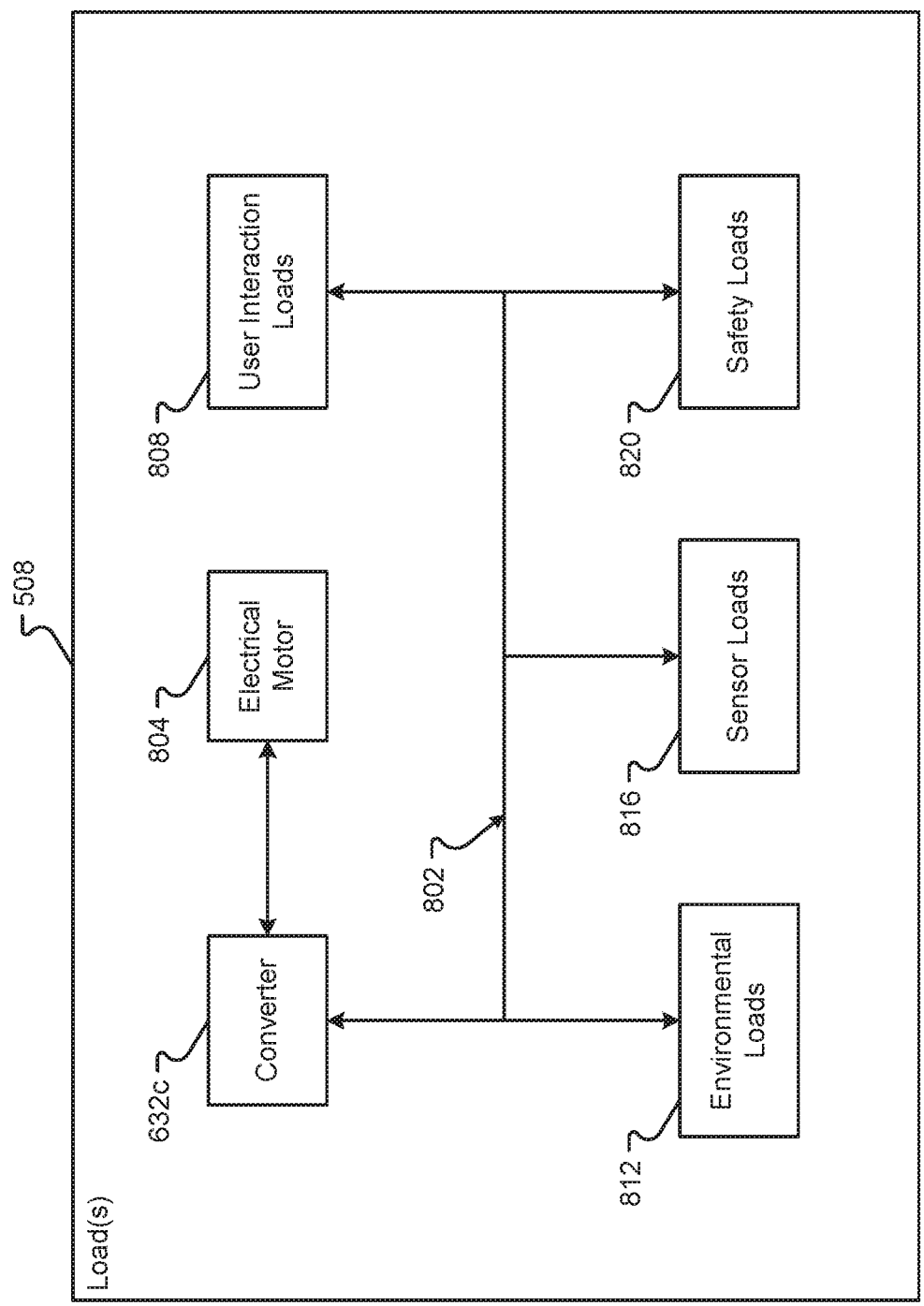
FIG. 8 is a block diagram of an embodiment of loads associated with the electrical system of the vehicle.

An embodiment of one or more loads 508 associated with the vehicle 100 may be as shown in FIG. 8. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508. The converter 632c may be an interface from the power generation unit 504 or the power storage 208 into the loads 508. The converter 632c may be the same or similar to electric converter 632a as shown in FIG. 6. Similar to the discussion of the converter 632b in FIG. 7, the converter 632c may be eliminated, if the electric converter 632a, shown in FIG. 6, is present. However, the converter 632c may further condition or change the energy characteristics for the bus 802 for use by the loads 508. The converter 632c may also provide electrical energy to electric motor 804, which may power the vehicle 100.

The electric motor 804 can be any type of DC or AC electric motor. The electric motor may be a direct drive or induction motor using permanent magnets and/or winding either on the stator or rotor. The electric motor 804 may also be wireless or include brush contacts. The electric motor 804 may be capable of providing a torque and enough kinetic energy to move the vehicle 100 in traffic. In some embodiments, the electric motor 804 may be similar, if not identical, to the electric motor 212 described in conjunction with FIG. 2.

The different loads 508 may also include environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100. The environmental loads 812 can be any loads used to control the environment within the vehicle 100. For example, the air conditioning or heating unit of the vehicle 100 can be environmental loads 812. Other environmental loads can include lights, fans, and/or defrosting units, etc. that may control the environment within, and/or outside of, the vehicle 100. The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
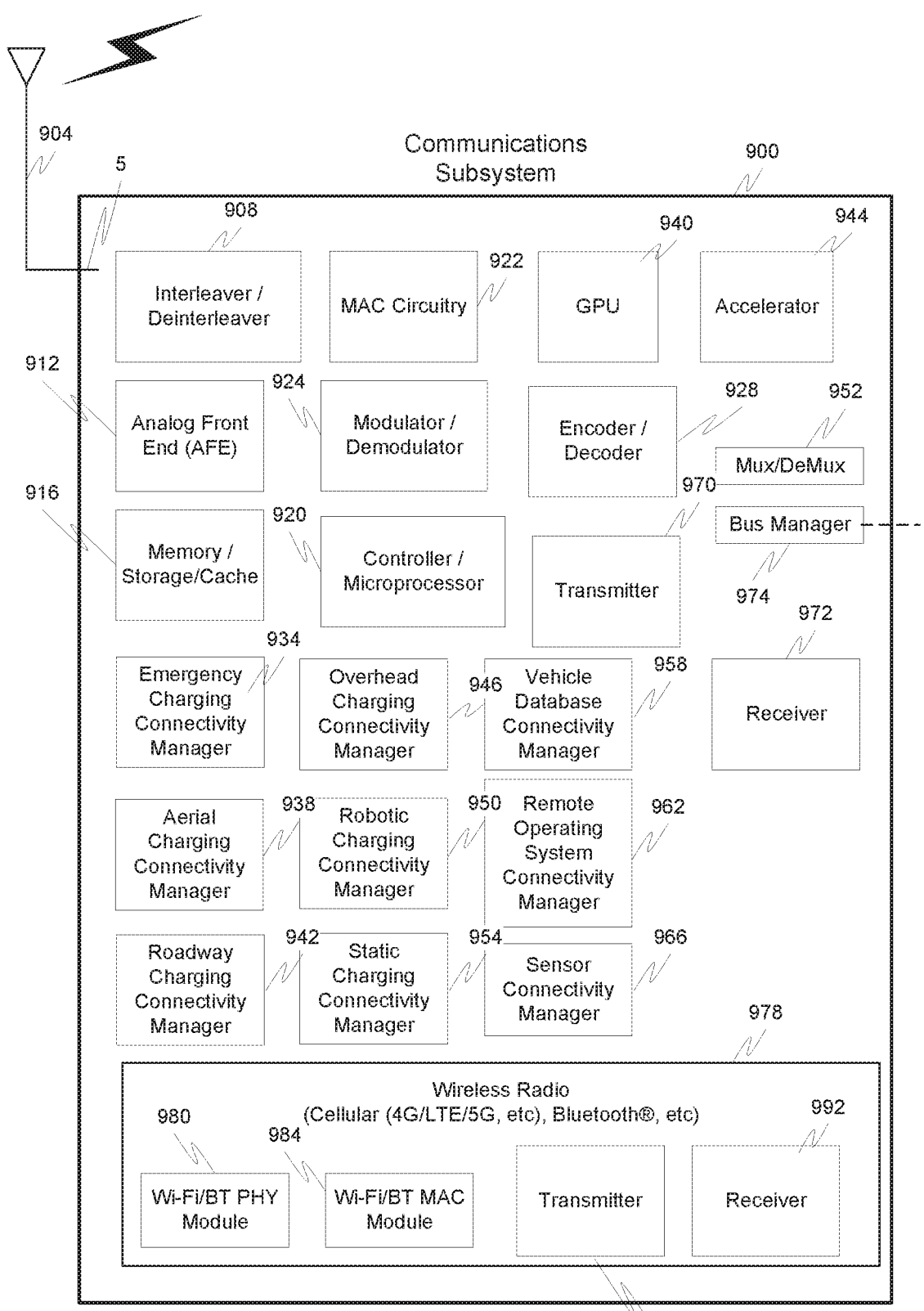
FIG. 9 is a block diagram of an embodiment of a communications subsystem of the vehicle.

FIG. 9 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 900, in addition to well-known componentry (which has been omitted for clarity), includes interconnected elements including one or more of: one or more antennas 904, an interleaver/deinterleaver 908, an analog front end (AFE) 912, memory/storage/cache 916, controller/microprocessor 920, MAC circuitry 922, modulator/demodulator 924, encoder/decoder 928, a plurality of connectivity managers 934-966, GPU 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The device 400 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system in order to convert the analog signal into a digital signal for processing and vice-versa.

The subsystem 900 can also include a controller/microprocessor 920 and a memory/storage/cache 916. The subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 900 can further include a transmitter 970 and receiver 972 which can transmit and receive signals, respectively, to and from other devices, subsystems and/or other destinations using the one or more antennas 904 and/or links/busses. Included in the subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some embodiments, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the subsystem 900 and one or more of the systems disclosed herein and one or more other devices/systems. The connectivity managers include a vehicle database connectivity manager 958, a remote operating system connectivity manager 962 and a sensor connectivity manager 966.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
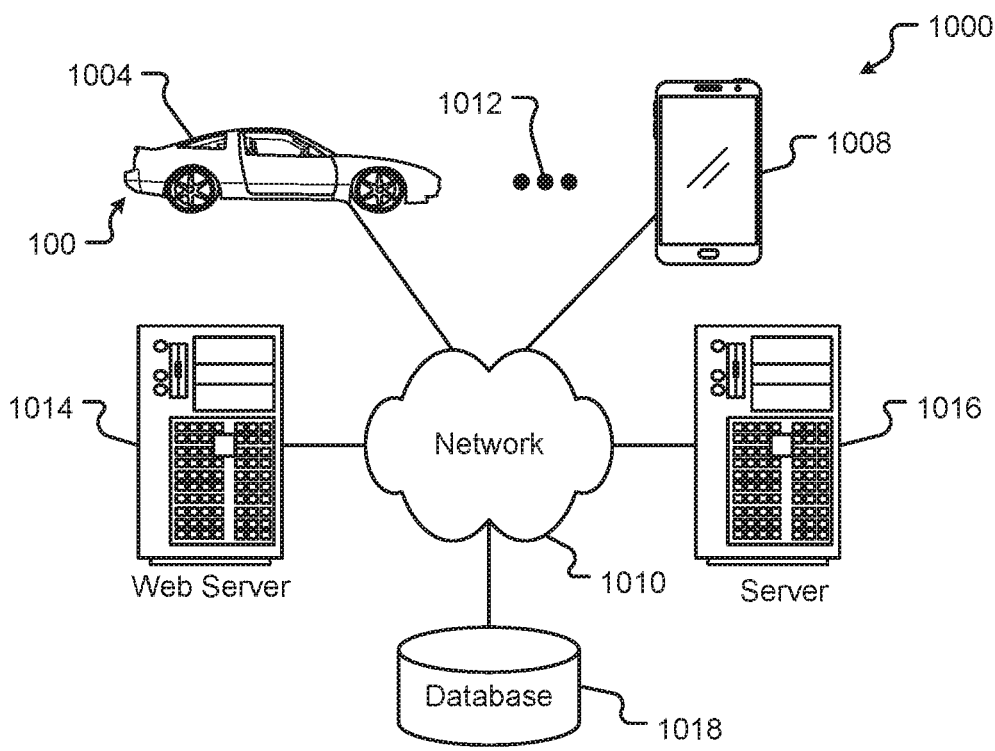
FIG. 10 is a block diagram of a computing environment associated with the embodiments presented herein.

FIG. 10 illustrates a block diagram of a computing environment 1000 that may function as the servers, user computers, or other systems provided and described herein. The environment 1000 includes one or more user computers, or computing devices, such as a vehicle computing device 1004, a communication device 1008, and/or more 1012. The computing devices 1004, 1008, 1012 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available operations as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server. Although for ease of description, FIG. 10 illustrates a separate web server 1014 and file/application server 1016, those skilled in the art will recognize that the functions described with respect to servers 1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described in FIGS. 1-10.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20i®, that is adapted to store, update, and retrieve data in response to SQL-formatted commands.

Figure 11:
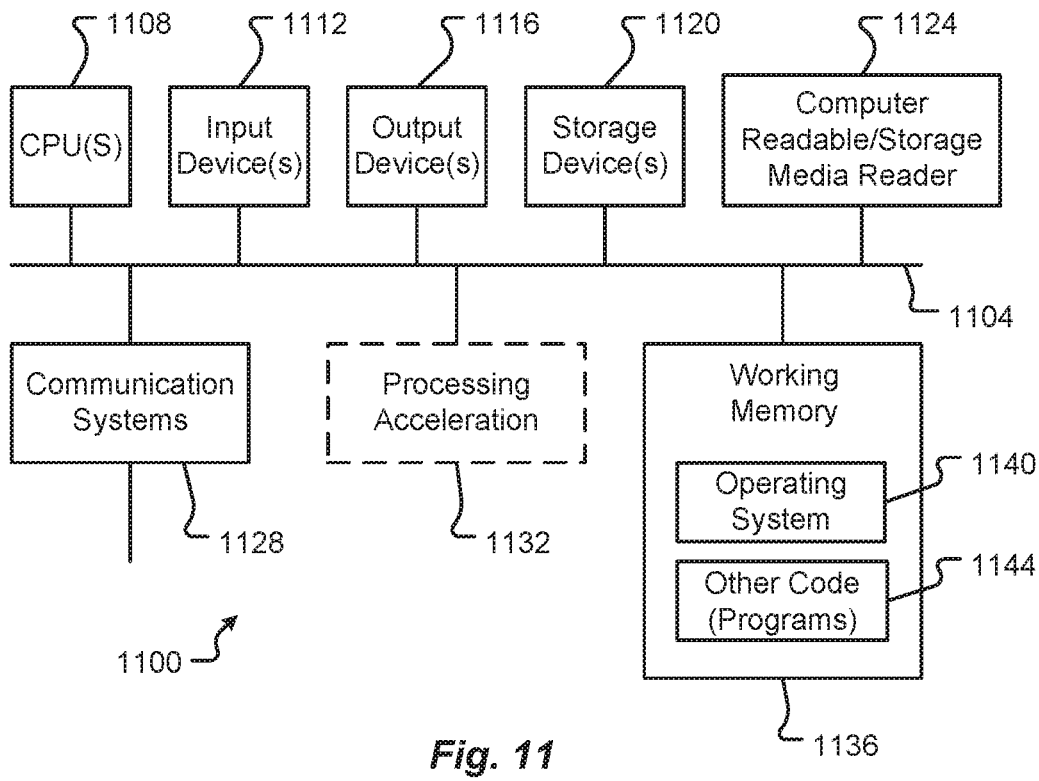
FIG. 11 is a block diagram of a computing device associated with one or more components described herein.

FIG. 11 illustrates one embodiment of a computer system 1100 upon which the servers, user computers, computing devices, or other systems or components described above may be deployed or executed. The computer system 1100 is shown comprising hardware elements that may be electrically coupled via a bus 1104. The hardware elements may include one or more central processing units (CPUs) 1108; one or more input devices 1112 (e.g., a mouse, a keyboard, etc.); and one or more output devices 1116 (e.g., a display device, a printer, etc.). The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., a modem, a network card (wireless or wired), an infra-red communication device, etc.); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 12A:
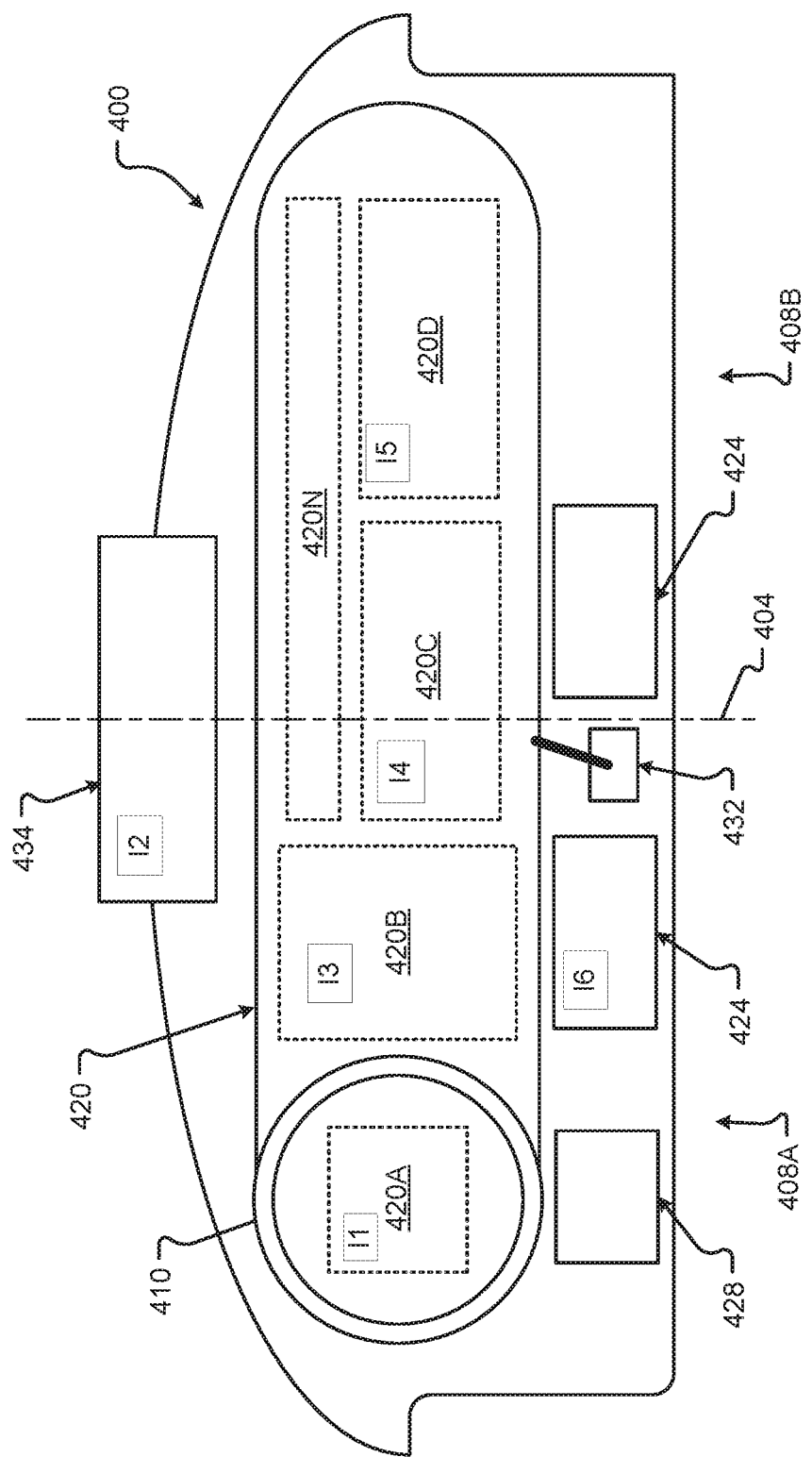
FIG. 12A illustrates one embodiment of a first presentation of information on a travel context-adjusted display device of a vehicle.
Figure 12B:
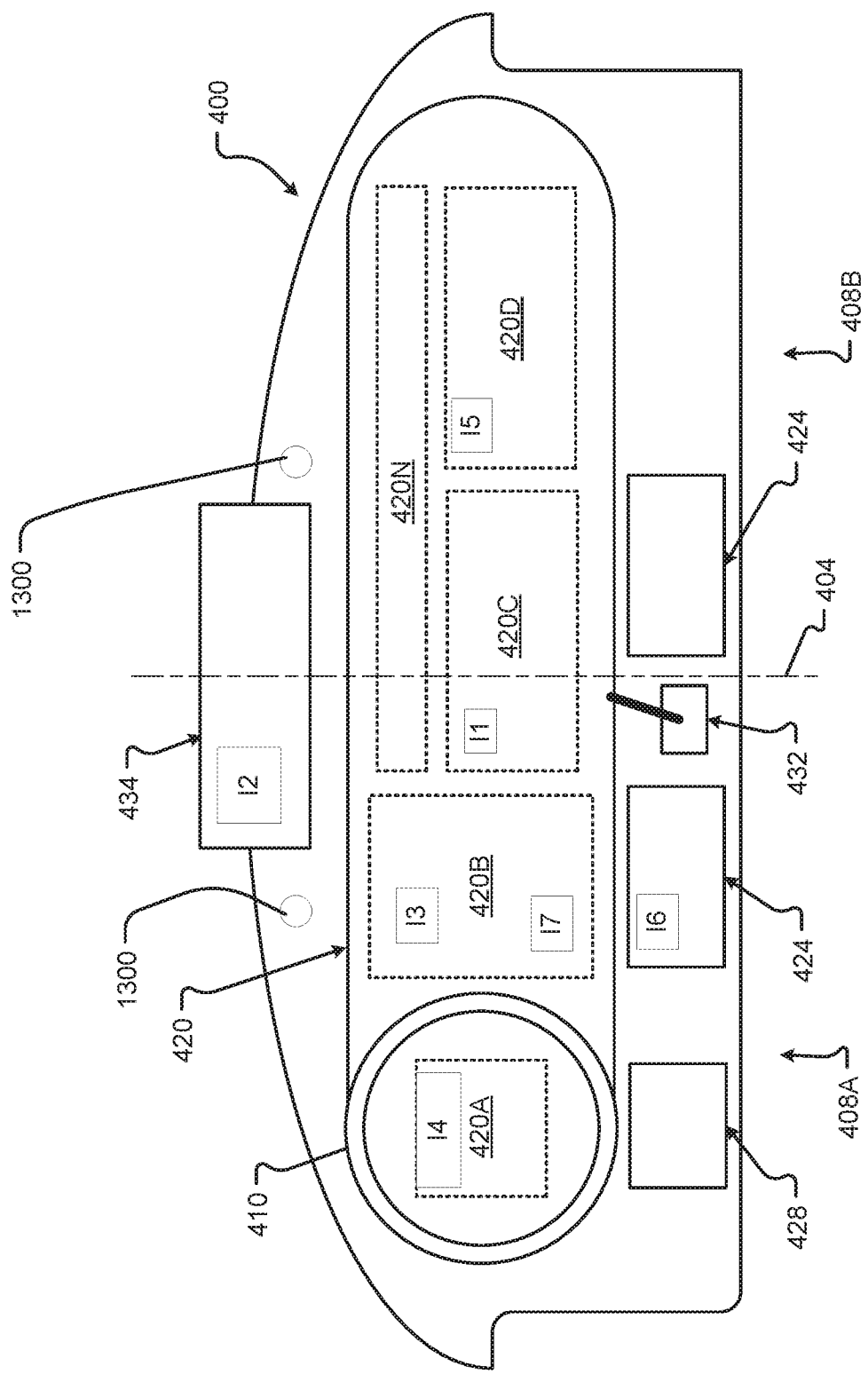
FIG. 12B illustrates one embodiment of a second presentation of information on a travel context-adjusted display device of a vehicle.

FIG. 12B illustrates one or more sensors of a vehicle in accordance with embodiments of the present disclosure. FIG. 12B is the same as FIG. 12A except for FIG. 12B includes one or more sensors 1300 (also referred to as sensor(s) 1300).

The sensors 1300 are part of the sensor loads 816 discussed with respect to FIG. 8 and are managed by the sensor connectivity manager 966 discussed with reference to FIG. 9. According to one embodiment, the controller/microprocessor 920 automatically adjusts the display device of the vehicle 100 based on output received from the sensors 1300. Example operations of the controller/microprocessor 920 are discussed in more detail below with reference to FIGS. 12A-17.

In one embodiment, the sensors 1300 monitor a travel context (or state) of the vehicle 100. Examples of travel context include animate objects, inanimate objects, or environmental surroundings spatially proximal to the vehicle 100 (such as road conditions, traffic conditions, nearby vehicles, etc.) and/or a route of the vehicle 100 as well as a state of the vehicle itself or a component thereof (such as state of the power source, vehicle travel range, vehicle altitude, engine temperature, etc.), and/or combinations thereof. In some embodiments, one or more sensors 1300 can observe or monitor the environment, driving conditions, or context of the travel. From these observations and/or other (e.g., additional, etc.) information, the dash, head unit, HUD or other displays may be adjusted automatically to assist the driver/passenger. By way of example, frequent starts and stops in traffic may cause a temperature gauge to be introduced to the display to, among other things, alert an occupant of potential overheating issues before damage occurs. New widgets, icons, and/or display elements may be added when needed, such as, a temperature gauge when towing, an altimeter when climbing mountains, a temperature control when the outside temperature is over or under predetermined benchmarks, etc., as described herein. Thus, each sensor 1300 may include one or more types of devices to assist with monitoring the travel context. For example, the sensors 1300 may include one or more cameras, such as infrared/near-infrared cameras (or depth cameras) used for mapping the surroundings of the vehicle 100. Such cameras may operate according to time-of-flight principles to achieve obstacle detection, lane detection, etc. For example, a light source of the sensor 1300 (or associated with the sensor 1300) emits light (e.g., infrared light) toward surroundings of the vehicle 100. Light emitted from the light source is then reflected by objects external to the vehicle and the reflected light is sensed by individual pixels of a camera of the sensor 1300. Based on time-of-flight principles (i.e., a time taken for the light emitted from the light source to reflect off on an object and then be sensed by the pixels of the camera), the controller/microprocessor 920 generates a depth map (where each pixel is assigned a depth value based on the elapsed time between the light source emitting light and the camera receiving the reflected light), which is a three-dimensional representation of the surroundings of the vehicle 100 that is within the camera's range. For obstacle/lane detection, the ongoing generation of the depth map is analyzed by the controller/microprocessor 920 to detect the obstacles/lanes in the roadway. It should be understood that example embodiments are not limited to the above described method for mapping surroundings of the vehicle 100, and that other known methods may be used.

Other types and locations of sensors 1300 for monitoring a travel context of the vehicle 100 include vibration sensors (e.g., accelerometers) for monitoring vehicle vibration, altitude sensors for monitoring an altitude of the vehicle, temperature sensors for ambient and/or engine temperature, ultrasonic sensors configured to detect movement on the exterior of the vehicle 100, pressure sensors configured to detect ambient pressure conditions at the exterior of the vehicle 100, etc., and/or combinations thereof. It should be understood that a number, type, and location of the sensors 1300 are not limited to the options shown in FIG. 12 and may vary according to design parameters, such as a condition to be monitored. Thus, additional sensors 1300 may be located in and/or on parts of the vehicle 100 not specifically illustrated in FIG. 12.

FIG. 12A illustrates a first presentation of information on a travel context-adjusted display device of a vehicle 100. FIG. 12A is the same as FIG. 4 except that FIG. 12A illustrates a first presentation of information as items I1 to I6 on a display device of the vehicle 100, where the display device refers to the collection of the vehicle operational display 420, the one or more auxiliary displays 424, the heads-up display 434, the power management display 428, the input device 432, and/or other displays (mobile device displays) related to the vehicle 100. The information includes at least one of vehicle information about the vehicle and environment information about an environment surrounding of the vehicle 100. Examples of vehicle information include any information about the status or condition of the vehicle 100, such as vehicle speed, engine temperature, battery level, trip and/or overall mileage, car stereo settings, and the like. Examples of environment information include any information about the status or condition of the environment of the vehicle, such as external ambient whether conditions, altitude, positional information (e.g., GPS interface), and the like. For example, the vehicle 100 may consider a change in the temperate zone (e.g., temperature, pressure, and/or environment about a vehicle 100, etc.) as the vehicle 100 travels in determining to adjust the presentation. In one embodiment, temperature gauges may be added in high-heat temperate zones (e.g., based on a measured temperature exterior to the vehicle 100). In some embodiments, a vehicle mode may be engaged, such as four-wheel drive, etc. when conditions are detected (e.g., low-temperature, icy, or snowy conditions—when drive slip is detected and/or when temperatures fall below a threshold value, etc.). In this case, an indication of four-wheel drive information may be rendered as part of the modified presentation. In any event, the first presentation of the information as items I1-I6 may be a default presentation of the information that is displayed each time the vehicle 100 is restarted. Items I1-I6 may be presented in the form of one or more widgets, one or more icons, one or more menus, one or more windows, one or more tabs, and the like.

FIG. 12B illustrates a second presentation of information on a travel context-adjusted display device of a vehicle 100. Elements in FIG. 12B are the same as FIG. 12A except that FIG. 12B illustrates a second presentation of information as items I1 to I7 on a display device on the vehicle 100. Comparing the first presentation of the information in FIG. 12A and the second presentation of the information in FIG. 12B reveals that the second presentation of information includes additional information as item I7 as well as a re-rendering items I1 and I4, where locations of items I1 and I4 have swapped and item I4 has been resized (e.g., increased in size). In addition to changing sizes, locations, and content of the information (e.g., by adding and/or subtracting information items from the display device), it should be understood that the controller/microprocessor 920 may also change other properties of the information, such as a brightness of the items, a color of the items, and/or other visual settings associated with displaying information when rendering the second presentation.

Further, the controller/microprocessor 920 may associate a presentation of the information with a particular occupant, such as the driver, and store the association as a user profile in the memory/storage/cache 916. Upon determining that an occupant has an associated user profile indicating a preferred presentation of the information (e.g., based on output from at least one sensor 1300), the controller/microprocessor 920 may automatically switch to the presentation of the information indicated by the user profile. The vehicle 100 may include one or more biometric sensors (e.g., retina scanner, fingerprint scanner, etc.) to assist with identifying the occupant to select an associated user profile.

The controller/microprocessor 920 may render the second presentation of the information shown in FIG. 12B to replace the first presentation of information shown in FIG. 12A for reasons discussed in more detail below with reference to FIGS. 13-16.

Figure 13:
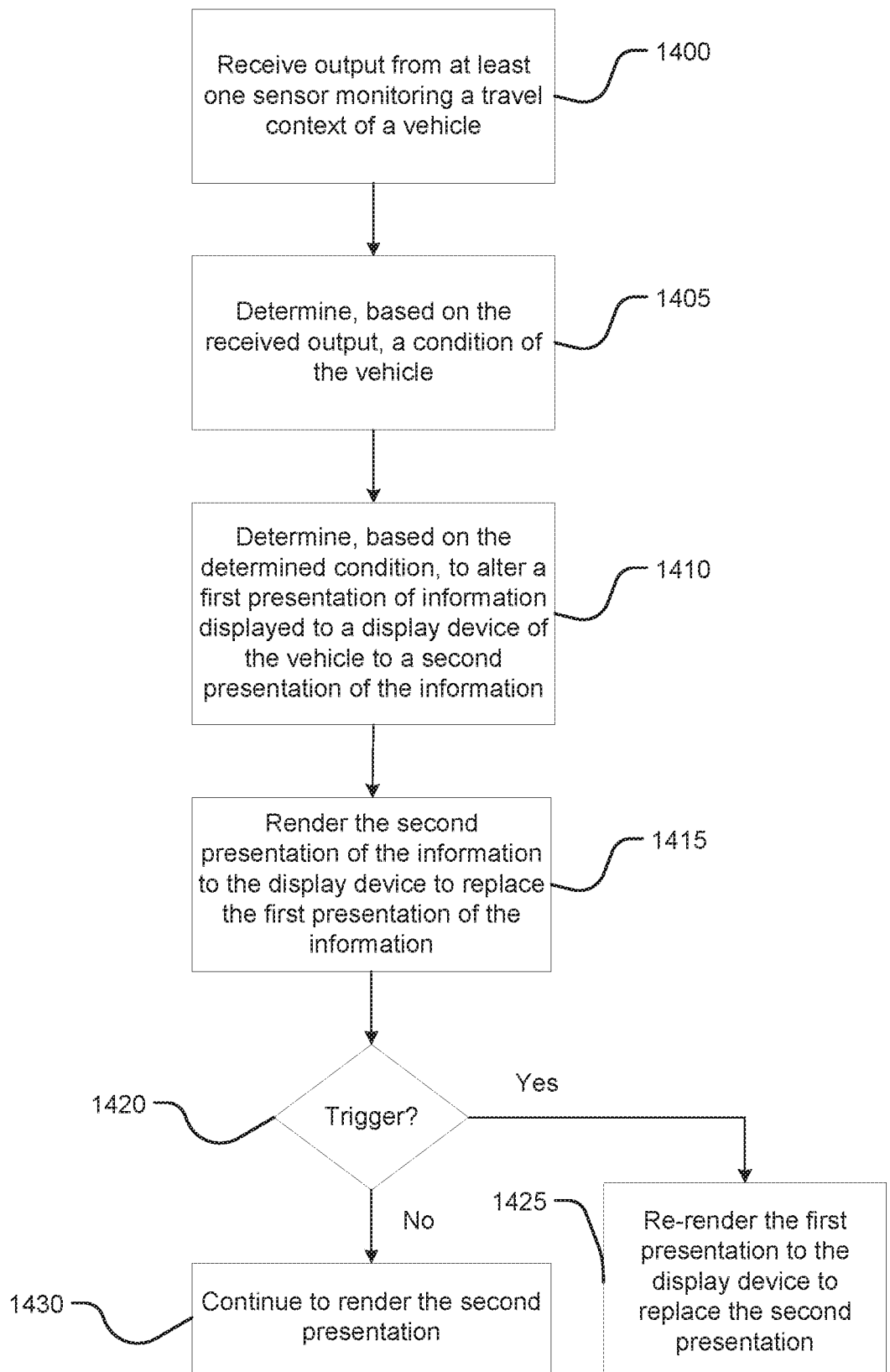
FIG. 13 illustrates example operations of the controller/microprocessor 920 according to at least one embodiment.

FIG. 13 illustrates example operations of the controller/microprocessor 920. FIG. 13 is a flow diagram of a first method for rendering a second presentation of information to a display device to replace a first presentation of the information on the display device accordance with embodiments of the present disclosure. While a general order for the steps of the method is shown in FIG. 13, the method can include more or fewer steps or can arrange the order of the steps differently than those shown in FIG. 13. Generally, the method starts at operation 1400 and ends at operation 1430. The method can be executed as a set of computer-executable instructions executed by a computer system and encoded or stored on a computer readable medium. For example, the operations discussed with respect to FIG. 13 may be implemented by the controller/microprocessor 920 carrying instructions stored on a computer readable medium, such as the memory/storage/cache 916. Hereinafter, the FIG. 13 shall be explained with reference to the systems, components, assemblies, devices, user interfaces, environments, software, etc. described in conjunction with FIGS. 1-12B.

In operation 1400, the controller/microprocessor 920 receives output from at least one sensor 1300 or from the communications subsystem monitoring a travel context of a vehicle 100.

In operation 1405, the controller/microprocessor 920 determines, based on the received output, a condition (or state) of the vehicle 100. For example, the controller/microprocessor 920 may use the output from the sensor 1300 as well as information from other vehicle sensors in sensor loads 816 or from the or from the communications subsystem to determine the condition of the vehicle 100. In another example, the controller/microprocessor 920 can receive output from the charge management unit 708 (e.g., BMS) with respect to a state of the battery 704 or battery pack (e.g., voltage: total voltage, voltages of individual cells, minimum and maximum cell voltage or voltage of periodic taps; temperature: average temperature, coolant intake temperature, coolant output temperature, or temperatures of individual cells; state of charge (SOC) or depth of charge (DOD), to indicate the charge level of the battery or individual cells; state of health (SOH), a variously-defined measurement of the remaining capacity of the battery as % of the original capacity; state of power (SOP), the amount of power available for a defined time interval given the current power usage, temperature and other conditions; state of Safety (SOS) coolant flow: for air or fluid cooled batteries and/or current: current in or out of the battery). In another example, the controller/microprocessor 920 can receive output from onboard electronic devices such as the infotainment system, built-in tablet devices, or user devices such as smartphones, tablets, and smart watches. The controller/microprocessor 920 may receive this information via the communications subsystem or other communications equipment within the vehicle such as an onboard local area network. For example, a user's smartphone or other device may contain map or route information or calendar information that may provide information to the controller/microprocessor 920 concerning the user's planned route. This information can be utilized by the controller/microprocessor 920 to predict travel and further calculate range information. A variety of data concerning the operator or one or more passengers of the vehicle can be communicated to the controller/microprocessor 920 to create occupant context useful to determine driving conditions and modified driving operations to improve driving conditions.

In operation 1410, the controller/microprocessor 920 determines, based on the determined condition of the vehicle, to alter a first presentation of information displayed to a display device (i.e., one or more of displays 420, 424, 434, 428, 432) of the vehicle 100 to a second presentation of the information displayed to the display device. As discussed with reference to FIGS. 12A and 12B, the information includes at least one of vehicle information about the vehicle and environment information about the surroundings of the vehicle.

In operation 1415, the controller/microprocessor 920 renders the second presentation of the information to the display device of the vehicle 100 to replace the first presentation of the information displayed to the display device of the vehicle 100. The controller/microprocessor 920 may render the second presentation based on at least one of one or more preferences of the occupant, a recurrence frequency of the condition (e.g., a number of times the condition occurs over a desired time interval, for example, 5 minutes), and a priority level associated with the condition determined in operation 1405. The one or more preferences may include a size, a color, a brightness, a location, and/or other occupant defined visual settings for the information to be displayed. The condition may have an associated recurrence frequency threshold that should be met within a threshold amount of time before the controller/microprocessor 920 renders the second presentation to include information about the condition. Specific examples of operations 1405-1415 are described in more detail below with reference to FIGS. 16 and 17.

The priority level is based on at least a safety score associated with the condition. Thus, the priority level may be representative of how relevant the information to be displayed is to passenger safety (e.g., icy road). The safety score may be represented as a number that has an associated weight that assists with determining the priority level. For example, each condition detectable by the controller/microprocessor 920 may have an initial (or default) priority level that is assigned in advance or determined with the assistance of a raw priority score (RPS) in Equation 1. Additionally or alternatively, the controller/microprocessor 920 may continuously update the raw priority score for each condition using Equation 1.

$$RPS=\beta S \qquad \text{Equation 1}$$

Figure 16:
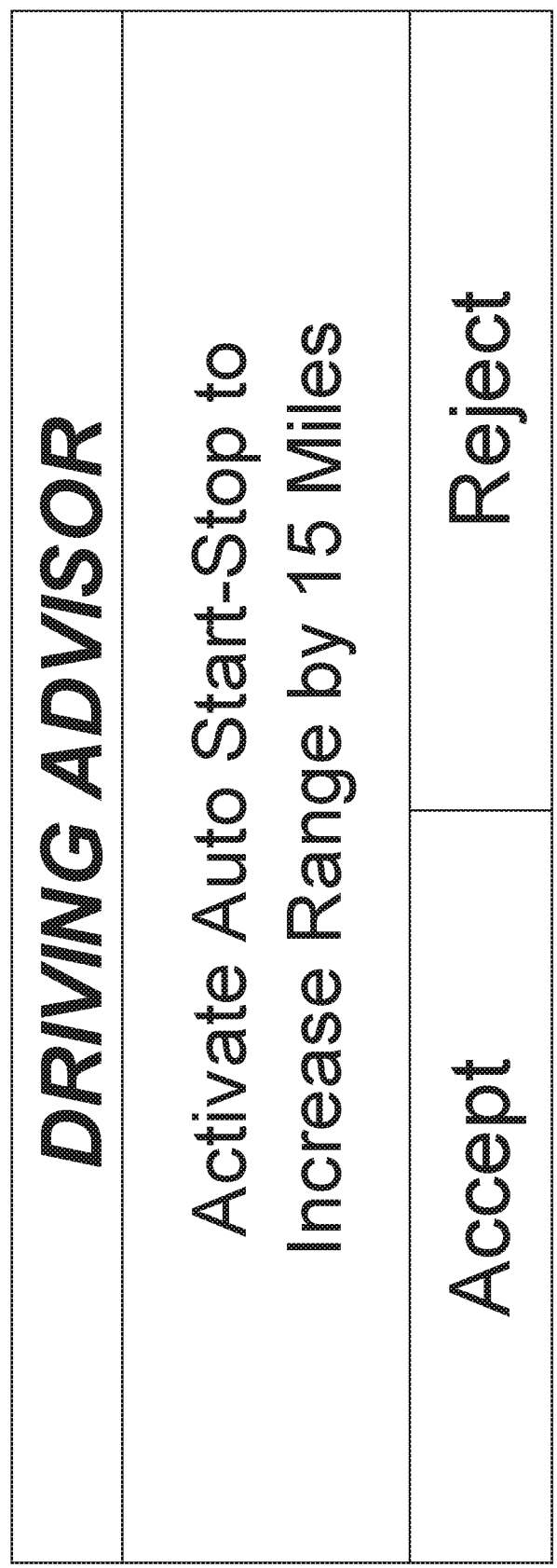
FIG. 16 illustrates an example look-up-table (LUT) that assists with determining effects for rendering for the second presentation.

In Equation 1, S is a value that represents the safety score associated with the condition and $\beta$ is the weight associated with the safety score. Value S and weight $\beta$ may be fixed and/or changeable design parameters based on user input and/or empirical evidence. The controller/microprocessor 920 may assign a priority level to a condition based on the raw priority score by evaluating the raw priority score against one or more thresholds associated with each priority level. The controller/microprocessor 920 may store the priority level in the memory/storage/cache 916. According to one embodiment, the controller/microprocessor 920 may store the priority level as part of a look-up-table (LUT) to assist with determining effects for rendering for the second presentation based on the priority level, one or more occupant preferences, and/or a recurrence frequency of the condition. FIG. 16 illustrates an example LUT and is discussed below in more detail.

Still referring to FIG. 13, the controller/microprocessor 920 may re-render the first presentation to the display device to replace the second presentation in response to a trigger. For example, in operation 1420, the controller/microprocessor 920 determines whether a trigger has occurred. If so, then the controller/microprocessor 920 performs operation 1425 to re-renders the first presentation to replace the second presentation on the display device. If not, then the controller/microprocessor continues to render the second presentation to the display device in operation 1430. The trigger may be a power reset event in which the display device loses, then regains power, for example, as a result of the vehicle 100 being shut-off and then restarted. In this case, the first presentation may be a default presentation of the information to the display device set by, for example, the manufacturer of the vehicle 100 and/or the user profile mentioned above. According to one embodiment, the trigger is tied to an elapsed time from the performance of operation 1415. For example, the controller/microprocessor 920 may re-render the first presentation if the elapsed time is over a desired threshold time, such as 5 minutes. The threshold time may be a design parameter set based on user input and/or empirical evidence. In another example, the controller/microprocessor 920 re-renders the first presentation after ceasing to detect the condition. In yet another example, the controller/microprocessor 920 re-renders the first presentation after failing to detect any changes in the condition within the threshold time. In some embodiments, the controller/microprocessor 920 may re-render the first presentation upon detecting a change in the driving, operating, or controlling, occupant associated with the vehicle 100. For instance, control may be transferred from one occupant to another in the vehicle 100. In one control-transfer scenario, an occupant may switch positions with another occupant in a controlling position (e.g., the driver's seat, etc.). In another control-transfer scenario, an occupant may transfer control of the vehicle 100 to another occupant in a different seat or area of the vehicle 100. In any event, a change in an occupant associated with a control of one or more operations of the vehicle 100 may trigger the re-rendering of the first presentation. Although not specifically described herein, it should be understood that additional triggers are within the scope of example embodiments.

Figure 14:
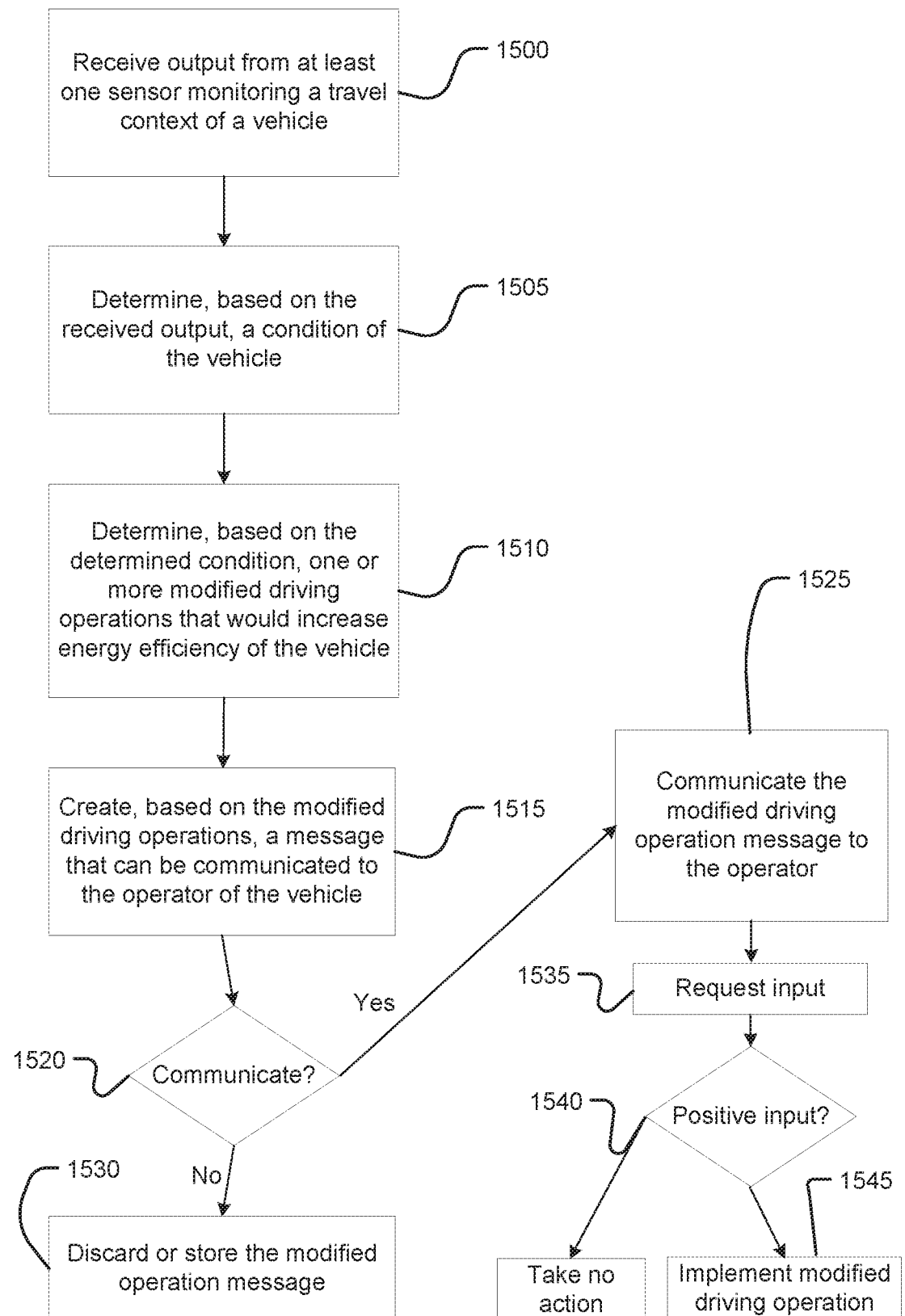
FIG. 14 illustrates example operations of the controller/microprocessor 920 according to at least one embodiment.

FIG. 14 illustrates example operations of the controller/microprocessor 920 according to at least one embodiment. FIG. 14 is a flow diagram of a method for determining and communicating modified driving operations in accordance with embodiments of the present disclosure. While a general order for the steps of the method is shown in FIG. 14, the method can include more or fewer steps or can arrange the order of the steps differently than those shown in FIG. 14. Generally, the method starts at operation 1500. The method can be executed as a set of computer-executable instructions executed by a computer system and encoded or stored on a computer readable medium. For example, the operations discussed with respect to FIG. 14 may be implemented by the controller/microprocessor 920 carrying instructions stored on a computer readable medium, such as the memory/storage/cache 916. Hereinafter, the FIG. 14 shall be explained with reference to the systems, components, assemblies, devices, user interfaces, environments, software, etc. described in conjunction with FIGS. 1-12B.

In operation 1500, the controller/microprocessor 920 receives output from at least one sensor 1300 or from the communications subsystem monitoring a travel context of a vehicle 100.

In operation 1505, the controller/microprocessor 920 determines, based on the received output, a condition (or state) of the vehicle 100. For example, the controller/microprocessor 920 may use the output from the sensor 1300 as well as information from other vehicle sensors in sensor loads 816 or information from the communications subsystem to determine the condition of the vehicle 100.

In operation 1510, the controller/microprocessor 920 determines, based on the determined condition of the vehicle (e.g., the battery or battery pack) and other vehicle-related information (e.g., travel route stored in on board navigation, scheduled appointments in an electronic calendar of an occupant, a displayed content of an electronic device associated with an occupant (e.g., a smart phone, tablet computer, laptop, on board vehicle computer, etc.), and the like, one or more modified driving operations that would increase energy efficiency of the vehicle. Such modified driving operations may include, for example, reduced speed, less aggressive breaking, reduced use of onboard electrical systems such as air condition or entertainment systems, and "auto stop-start."

In operation 1515, the controller/microprocessor 920 creates, based on the modified driving operations, a message that can be communicated to the operator of the vehicle. The message may take the form of a visual display, an audio message, or another suitable medium. The message may be created in real time or can be fetched from a database of messages associated with predetermined modified driving operations.

In operation 1520, the controller/microprocessor 920 determines whether to communicate the modified driving operation message to the operator of the vehicle. This determination can be based on various rules or conditions. For example, the message may be communicated automatically when it is created, at certain time intervals, in response to an input command from the operator such as a voice command or activating a switch, button, or touchscreen, or based on recurrence frequency of the condition (e.g., a number of times the triggering condition occurs over a desired time interval, for example, 5 minutes) or the priority level of the condition that triggered the determination of the modified driving operation. The conditions for communicating the message may be based on the preferences of the operator or may be determined by the manufacturer of the vehicle. Specific examples of operations 1505-1520 are described in more detail below with reference to FIGS. 16 and 17.

The priority level is based on at least a safety score associated with the condition. Thus, the priority level may be representative of how relevant the information to be displayed is to passenger safety (e.g., icy road). The safety score may be represented as a number that has an associated weight that assists with determining the priority level. For example, each condition detectable by the controller/microprocessor 920 may have an initial (or default) priority level that is assigned in advance or determined with the assistance of a raw priority score (RPS) in Equation 1. Additionally or alternatively, the controller/microprocessor 920 may continuously update the raw priority score for each condition using Equation 1.

$$RPS=\beta S \qquad \text{Equation 1}$$

In Equation 1, S is a value that represents the safety score associated with the condition and $\beta$ is the weight associated with the safety score. Value S and weight $\beta$ may be fixed and/or changeable design parameters based on user input and/or empirical evidence. The controller/microprocessor 920 may assign a priority level to a condition based on the raw priority score by evaluating the raw priority score against one or more thresholds associated with each priority level. The controller/microprocessor 920 may store the priority level in the memory/storage/cache 916. According to one embodiment, the controller/microprocessor 920 may store the priority level as part of a look-up-table (LUT) to assist with determining effects for rendering for the second presentation based on the priority level, one or more occupant preferences, and/or a recurrence frequency of the condition. FIG. 16 illustrates an example LUT and is discussed below in more detail.

If, in operation 1520, the controller/microprocessor 920 determines that the message should be communicated, the controller/microprocessor 920 communicates the message to the operator in operation 1525. The message may be communicated, for example, by generating a second display as described in detail above.

If, in operation 1520, the controller/microprocessor 920 determines that the message should not be communicated, the controller/microprocessor 920 in operation 1530 either discards the message or stores the message in a memory for later communication based on a separate set of rules and conditions.

In one embodiment, the controller/microprocessor 920 in operation 1535 requests an input from the operator indicating whether the modified driving operations should be implemented by the controller/microprocessor 920. The input can be provided, for example, as a voice command or by activating a switch, button or touchscreen. An example of an input request is given in FIG. 16.

In this embodiment, if, in operation 1540, the controller/microprocessor 920 determines that the operator has provided a positive input in response to the request in operation 1535, the controller/microprocessor 920 implements the modified driving operations in operation 1545 by, for example, sending signals to one or more actuators to control one or more vehicle components to modify the operation of the vehicle. Otherwise, the controller/microprocessor 920 takes no further action.

As one example of the operation show in FIG. 14, the controller/microprocessor 920 may determine whether the condition is determined to include that the vehicle 100 has a remaining range below a threshold difference to the distance to the nearest refueling or recharging station. For example, the vehicle 100 may have a remaining range of 15 miles and the nearest refueling or recharging station may be at a distance of 10 miles. In this scenario, the threshold difference is 5 miles. If so, the controller/microprocessor 920 performs determines one or more modified driving operations that would extend the range beyond 15 miles.

By way of example, a driver of an electric vehicle (EV) asks a user interface having speech and voice recognition coupled with an onboard computer the question: "How can I improve my driving?" In response, the vehicle computer (e.g., driving advisor) can advise the driver from a couple perspectives. For instance, the driving advisor can say: (1) "By lowering the AC, you could boost the range by 30 miles"; (2) "By lowering the entertainment system volume, you could boost the range by 20 miles"; (3) "By turning on the "Auto stop-start" feature on engine vehicle, you could boost the range by 15 miles based on your current route"; (4) "By braking less aggressively, you could boost the range by 10 miles"; and/or (5) "By operating in, say, 50 mph in the next 10 miles, you could boost the range by 5miles based on your current route". For item (1), (2), and (3)—the driving advisor can further say that "Would you like me to implement that for you?" For item (4) and (5)—it is more up to the user on direct driving behavior.

By way of further example, the user interface includes a display and the display can be handled similar to the Office Assistant for Microsoft Office™. The persistency is similar but can deviate from the "pop-up" interface. For instance, the driving advisor notices that there are 50 miles left before recharging or refueling is necessary, but the nearest gas station or charging station is a little more than 50 miles of distance away. Once the notification of low fuel/charge is indicated, the five-perspective list can be evaluated and the driving advisor more aggressively recommends one or more of driving recommendations to the user based on the most useful tip (rather than waiting for the user to ask). The driving advisor can be a helpful friend that assists in real time the user. In a further example, the in-vehicle driving advisor can say "We are 60 miles away from the nearest charging station. But do not panic, by turning off the AC, we can get to the station safely." However, some drivers may not like this "living on the edge" scenario. After starting the vehicle, and after the driver inputs the GPS or other satellite-based destination, the driving advisor should automatically tell the user whether the remaining mileage allowed is cutting it too close. This example can be advantageous for those drivers who ignored the warning, or if the route has changed unexpectedly.

The driving advisor can focus on generic and emergency scenarios that will boost the fuel economy if the user seeks for such advice. In generic scenarios, the driving advisor can provide tips on fuel economy improvement tips and implement them accordingly. In emergency scenarios, such as when a driver changed his/her destination last minute and did not realize fuel/charge is running out, the driving advisor can help with tips that may just help the driver reach its destination. While the tip can include adaptive cruise control, the driving advisor can provide other tips such as driving/braking behavior, use of auxiliary system, and use of features in the vehicle (stop/start) to make the vehicle even more efficient when the user asks for it.

FIG. 15 illustrates an example LUT that assists with determining modified driving operations based on the priority level of the condition, one or more occupant preferences associated with the condition, and/or a recurrence frequency of the condition.

FIG. 15 illustrates various conditions that may be determined by the controller/microprocessor 920 in accordance with the operations described in FIGS. 12A-15. The conditions include limited range, excess fuel consumption, dangerous weather conditions, traffic, or road conditions. As described with reference to FIG. 14, each of these conditions may have one or more of an associated safety score, a weight associated with the safety score, a raw priority score, a priority level, a recurrence frequency threshold to exceed within a threshold time, a presentation effect, and occupant preference(s). The safety score is representative of how relevant the condition is to occupant safety. For example, the more likely a condition is to have a negative impact on occupant safety, the higher the safety score. Thus, the condition of limited range has a highest safety score of 10 and weight of 1.0 in FIG. 15, while the condition excess fuel consumption receives a lower safety score of 5 and weight 0.2 because excess fuel consumption under normal driving conditions is unlikely to create an unsafe condition for the occupant. The LUT includes a raw priority score (RPS) for each condition and an associated priority level that is determined based on the RPS.

As noted above, aspects of the present disclosure may be implemented using a battery management system (BMS). A BMS is a system that manages a rechargeable battery apparatus, such as by protecting the battery from operating outside its safe operating area, monitoring its state, measuring data, calculating data, communicating that data, and controlling the environment of the battery. Aspects of the present disclosure may be implemented using a "smart battery pack" comprising a battery pack built together with a battery management system with an external communication data bus in communication with the communications subsystem to communicate information concerning the battery to the controller/microprocessor 920.

The BMS may monitor various states of the battery, including total voltage, voltages of individual cells, minimum and maximum cell voltage, voltage of periodic taps, average temperature, coolant intake temperature, coolant output temperature, temperatures of individual cells, charge level as indicated by state of charge (SOC) or depth of discharge (DOD), remaining capacity as a percentage of the original capacity (known as state of health (SOH)), the amount of power available for a defined time interval given the current conditions such as power usage, temperature and other conditions (state of power (SOP)), state of safety (SOS), coolant flow, and current.

The BMS may calculate values based on these measurements, such as maximum charge current, maximum discharge current, energy delivered since the last charge or charge cycle, impedance, charge being delivered to the battery by external systems or stored by the battery, total lifetime energy provided, total operating time, and total number of cycles.

The BMS may comprise a controller that communicates internally with measurement and calculation devices and communicates externally with the controller/microprocessor 920.

In another embodiment, the controller/microprocessor 920 is configured to store operator identification information in a memory. Each operator identification information is associated with an individual operator of the vehicle. The controller/microprocessor 920 is further configured to measure and record data concerning the driving operations, including habits and preferences, of the operator and associate that data with the operator and operator identification information. It will be understood that driving operation data may be obtained in a variety of means, including manual input by the operator; measurement of average speed, acceleration, air conditioner settings, infotainment system settings, and other user preferences; and association of specific operator actions with specific driving conditions. It will be further understood that techniques such as machine learning or other algorithms can be used to generate a driver profile associated with an operator based on this monitoring and processing of driving operations. The controller/microprocessor 920 in this embodiment is configured to identify one or more preferred driving operations from the modified driving operations to communicate to the operator based on the driver profile.

It should be understood that example embodiments contemplate the possibility for updating safety scores, weights, presentation effects, modified driving operations, and communication methods based on user input and/or empirical evidence.

It should be understood that every condition does not necessarily have an associated safety score, associated preferences, and/or an associated recurrence frequency, in which case the LUT may include only an initial or default values for those categories. It should be further understood that example embodiments are not limited to the conditions and presentations described with respect to FIGS. 13-17, and that other conditions and presentations are within the scope of example embodiments.

Any of the steps, functions, and operations discussed herein can be performed continuously and automatically.

The present disclosure involves a vehicle personal assistant capable of communicating modified driving operations to an operator of a vehicle. The present disclosure further involves a vehicle control system capable of monitoring driving conditions and determining modified driving operations to improve the performance of the vehicle, storing and delivering messages between the various subsystems of the vehicle control system, and implementing modified driving operations with or without input from the user. The vehicle personal assistant is further configured to communicate to the operator of the vehicle that modified driving operations have been implemented.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method of improving vehicle operation by monitoring and adjusting an operation of a continuously moving vehicle, the method comprising:
  monitoring, by a processor disposed within said vehicle, a state of a battery;
  obtaining, by the processor, from a plurality of sensors disposed within said vehicle, data related to conditions external to the vehicle;
  determining, by the processor, based at least in part on the monitored state of the battery and the obtained data, a maximum distance that the vehicle may travel before refueling and/or recharging is required;
  determining, by the processor, one or more possible improvements in driving conditions to increase the maximum distance;
  determining, by the processor, a modified driving operation based on the determined one or more possible improvements in driving conditions;
  constructing, by the processor, in real time, a message describing the determined modified driving operation;
  determining, by the processor, based upon a set of predetermined conditions, whether to communicate the message to an operator of the vehicle; and communicating, by the processor, the message to an operator of the vehicle via a travel context-adjusted display device if the determination of whether to communicate the message to an operator of the vehicle indicates that the message should be communicated.

2. The method of claim 1, wherein said monitored state of a battery comprises one or more of voltage, temperature, state of charge, depth of discharge, state of health, state of power, state of safety, coolant flow, and current.

3. The method of claim 1, wherein said obtained data comprises one or more of weather conditions, traffic conditions, road conditions, elevation, slope, and excess fuel consumption.

4. The method of claim 1, wherein said set of predetermined conditions comprise one or more of: a setting to automatically communicate all messages; a time interval; an input voice command; an input switch, button, or touchscreen command; a recurrence frequency of a monitored condition; and a priority level.

5. A vehicle, comprising:
a processor;
a plurality of sensors;
a travel context-adjusted display device; and
a computer-readable storage medium storing computer-readable instructions, which when executed by the processor while the vehicle is in continuous motion, cause the processor to perform operations comprising:
monitoring a state of a battery;
obtaining, from said plurality of sensors, data related to conditions external to the vehicle;
determining, based at least in part on the monitored state of the battery and the obtained data, a maximum distance that the vehicle may travel before refueling and/or recharging is required;
determining one or more possible improvements in driving conditions to increase the maximum distance;
determining a modified driving operation based on the determined one or more possible improvements in driving conditions;
constructing, in real time, a message describing the determined modified driving operation;
determining, based upon a set of predetermined conditions, whether to communicate the message to an operator of the vehicle; and
communicating the message to an operator of the vehicle via a travel context-adjusted display device if the determination of whether to communicate the message to an operator of the vehicle indicates that the message should be communicated.

6. The vehicle of claim 5, wherein said monitored state of a battery comprises one or more of voltage, temperature, state of charge, depth of discharge, state of health, state of power, state of safety, coolant flow, and current.

7. The vehicle of claim 5, wherein said obtained data comprises one or more of weather conditions, traffic conditions, road conditions, elevation, slope, and excess fuel consumption.

8. The vehicle of claim 5, further comprising a user interface configured to receive an input from an operator of the vehicle indicating that the determined modified driving operation should be implemented, wherein the processor is configured to communicate said determined modified driving operation in response to said input to one or more actuators to control one or more vehicle components to implement said determined modified driving operations.

9. The vehicle of claim 8, wherein said user interface comprises one or more of a button and a voice command module.

10. The vehicle of claim 5, wherein said processor is configurable by an operator to operate in at least two modes, wherein, when said processor is configured to operate in a first of said at least two modes, said processor is configured to communicate said determined modified driving operation to one or more actuators to control one or more vehicle components to implement said determined modified driving operation without receiving a signal from a user interface.

11. The vehicle of claim 5, wherein said set of predetermined conditions comprise one or more of: a setting to automatically communicate all messages; a time interval; an input voice command; an input switch, button, or touchscreen command; a recurrence frequency of a monitored condition; and a priority level.

12. The vehicle of claim 5, further comprising an audio module to audibly communicate said message to said operator.

13. A vehicle, comprising:
a processor;
a plurality of sensors;
a travel context-adjusted display device; and
a computer-readable storage medium storing computer-readable instructions, which when executed by the processor while the vehicle is in continuous motion, cause the processor to perform operations comprising:
identifying an operator of the vehicle;
obtaining data related to driving operations of the vehicle by the operator;
associating said driving operations with said operator;
constructing a driver profile associated with said operator based at least in part on said driving operations, wherein said driver profile comprises driver preferences;
storing said driver profile in a database;
monitoring a state of a battery;
obtaining, from said plurality of sensors, data related to conditions external to the vehicle;
determining, based at least in part on the monitored state of the battery and the obtained data, a maximum distance that the vehicle may travel before refueling and/or recharging is required;
determining a possible improvement in a driving condition to increase the maximum distance;
determining a set of modified driving operations based on the determined possible improvement in a driving condition;
identifying a preferred modified driving operation from the set of modified driving operations based at least in part on said driver profile;
constructing, in real time, a message describing said preferred modified driving operation;
determining, based upon a set of predetermined conditions, whether to communicate the message to an operator of the vehicle; and
communicating the message to the operator of the vehicle via a travel context-adjusted display device if the determination of whether to communicate the message to an operator of the vehicle indicates that the message should be communicated.

14. The vehicle of claim 13, wherein said monitored state of a battery comprises one or more of voltage, temperature, state of charge, depth of discharge, state of health, statue of power, state of safety, coolant flow, and current.

15. The vehicle of claim 13, wherein said obtained data comprises one or more of weather conditions, traffic conditions, road conditions, elevation, slope, and excess fuel consumption.

16. The vehicle of claim 13, further comprising a user interface configured to receive an input from an operator of the vehicle indicating that the preferred modified driving operation should be implemented, wherein the processor is configured to communicate said preferred modified driving operation in response to said input to one or more actuators to control one or more vehicle components to implement said preferred modified driving operation.

17. The vehicle of claim 16, wherein said user interface comprises one or more of a button and a voice command module.

18. The vehicle of claim 13, wherein said processor is configurable by an operator to operate in at least two modes, wherein when said processor is configured to operate in a first of said at least two modes said processor is configured to communicate said preferred modified driving operation to one or more actuators to control one or more vehicle components to implement said preferred modified driving operation without receiving a signal from a user interface.

19. The vehicle of claim 13, wherein said set of predetermined conditions comprise one or more of: a setting to automatically communicate all messages; a time interval; an input voice command; an input switch, button, or touchscreen command; a recurrence frequency of a monitored condition; and a priority level.

20. The vehicle of claim 13, further comprising an audio module to audibly communicate said message to said operator.

\* \* \* \* \*